(12) United States Patent
Afshar et al.

(10) Patent No.: US 10,186,159 B2
(45) Date of Patent: Jan. 22, 2019

(54) METHOD FOR EFFICIENTLY TEACHING CONTENT USING AN ADAPTIVE ENGINE AND A PHYSICAL INPUT ENTRY DEVICE

(71) Applicant: Brainquake Inc., Petaluma, CA (US)

(72) Inventors: Dariush Afshar, Campbell, CA (US); Pamela Briskman, Oakland, CA (US); Keith Devlin, Petaluma, CA (US); Steve Mays, San Rafael, CA (US); Michael Romero, San Jose, CA (US); Randy Weiner, Oakland, CA (US)

(73) Assignee: BRAINQUAKE INC., Petaluma, CA (US)

( * ) Notice: Subject to any disclaimer, the term of this patent is extended or adjusted under 35 U.S.C. 154(b) by 0 days.

(21) Appl. No.: 15/939,153

(22) Filed: Mar. 28, 2018

(65) Prior Publication Data
US 2018/0218623 A1 Aug. 2, 2018

Related U.S. Application Data

(63) Continuation-in-part of application No. 15/369,699, filed on Dec. 5, 2016, which is a continuation-in-part
(Continued)

(51) Int. Cl.
*G09B 1/18* (2006.01)
*G09B 5/14* (2006.01)
(Continued)

(52) U.S. Cl.
CPC ............... *G09B 1/18* (2013.01); *G09B 5/12* (2013.01); *G09B 5/14* (2013.01); *G09B 7/00* (2013.01)

(58) Field of Classification Search
CPC ..... G09B 1/18; G09B 5/12; G09B 5/14; G09B 7/00
See application file for complete search history.

(56) References Cited

U.S. PATENT DOCUMENTS

| 3,696,531 | A | * | 10/1972 | Stewart | G09B 19/02 434/198 |
| 4,218,609 | A | * | 8/1980 | Chin | G06C 1/00 235/109 |
| 4,713,009 | A | * | 12/1987 | Borenson | G09B 23/02 434/188 |
| 5,100,142 | A | * | 3/1992 | Cannata | A63F 9/0819 273/153 S |

(Continued)

OTHER PUBLICATIONS

U.S. Appl. No. 14/833,037, Notice of Allowance, dated May 10, 2018, 21 pages.

*Primary Examiner* — Eddy Saint-Vil
(74) *Attorney, Agent, or Firm* — Lathrop Gage L.L.P.

(57) ABSTRACT

A method for adaptively teaching content to a user comprises providing a plurality of teaching topics. The method includes sequentially associating a lead problem and a plurality of secondary problems with each of the plurality of teaching topics. Each of the lead problems and the plurality of secondary problems is an open-ended puzzle having a range of solutions and a difficulty rank. The range of solutions for each of the lead problems and the plurality of secondary problems has an optimal solution and a plurality of secondary solutions. A teaching topic is selected and a corresponding lead problem is presented to a user. User provides answer data via a physical input device having enmeshed gears. The user is provided another secondary problem in the selected teaching topic if the answer data matches one of the secondary solutions. The user is provided another lead problem if the answer data matches the optimal solution.

16 Claims, 16 Drawing Sheets

Related U.S. Application Data of application No. 15/044,641, filed on Feb. 16, 2016, application No. 15/939,153, which is a continuation-in-part of application No. 14/833,037, filed on Aug. 21, 2015, now Pat. No. 10,073,814, and a continuation-in-part of application No. 14/833,033, filed on Aug. 21, 2015, now Pat. No. 9,904,657.

(60) Provisional application No. 62/116,707, filed on Feb. 16, 2015, provisional application No. 62/040,091, filed on Aug. 21, 2014.

(51) Int. Cl.
  G09B 5/12 (2006.01)
  G09B 7/00 (2006.01)

(56) References Cited

U.S. PATENT DOCUMENTS

| | | | | |
|---|---|---|---|---|
| 5,149,269 | A * | 9/1992 | Ylitalo | G06C 1/00 434/203 |
| 7,309,064 | B1 * | 12/2007 | Engel | A63F 9/0819 273/153 S |
| 7,491,061 | B2 * | 2/2009 | Mickey | G09B 1/22 434/191 |
| 7,909,609 | B2 * | 3/2011 | Molin | G09B 23/04 434/188 |
| 2007/0166673 | A1 * | 7/2007 | Frieman | G06C 1/00 434/203 |
| 2008/0268407 | A1 * | 10/2008 | Brett | G09B 19/02 434/195 |

* cited by examiner

ND A PHYSICAL INPUT ENTRY DEVICE

CROSS REFERENCE TO RELATED
APPLICATIONS

This Application is a continuation-in-part of U.S. patent application Ser. No. 15/369,699 filed Dec. 5, 2016 and titled "Method for Efficiently Teaching Content Using an Adaptive Engine." The '699 Application is in-turn a continuation-in-part of U.S. patent application Ser. No. 15/044,641 filed Feb. 2, 2016, which is a continuation-in-part of U.S. patent application Ser. No. 14/833,033 filed Aug. 21, 2015, which is a continuation-in-part of U.S. patent application Ser. No. 14/833,037 filed Aug. 21, 2015. The '699 Application also claims priority to U.S. Provisional Application, Ser. No. 62/116,707 filed Feb. 16, 2015, and to U.S. Provisional Application, Ser. No. 62/040,091 filed Aug. 21, 2014. The disclosure of each these Applications is incorporated by reference herein in its entirety.

FIELD OF THE DISCLOSURE

The disclosure relates generally to systems and methods for educating users. More specifically, the disclosure relates to efficiently teaching content, educational content in particular, through the use of an adaptive engine. The adaptive engine continuously monitors user performance in real-time in order to alter and tailor the content offered to the user based on his or her progressive knowledge and ability. The adaptive engine may be in communication with a physical input entry device having gears which are manipulated by users to provide an input to the engine.

SUMMARY

In an embodiment, a method for adaptively teaching content to a user comprises providing a plurality of teaching topics. The method includes sequentially associating a lead problem and a plurality of secondary problems with each of the plurality of teaching topics. Each of the lead problems and the plurality of secondary problems is an open-ended puzzle having a range of solutions and a difficulty rank. The range of solutions for each of the lead problems and the plurality of secondary problems includes an optimal solution and a plurality of secondary solutions. The difficulty rank of the lead problem associated with one teaching topic is greater than the difficulty rank of each of the secondary problems associated with the one teaching topic. The difficulty rank of one secondary problem within the one associated teaching topic is greater than the difficulty rank of a preceding secondary problem within the one associated teaching topic. The method includes selecting a teaching topic and presenting to the user the lead problem associated with the selected teaching topic. The method comprises providing to the user a physical input entry device. The input entry device includes a primary gear and at least one secondary gear. Each of the primary gear and the at least one secondary gear is enmeshed with each other such that a rotation of the at least one secondary gear causes the primary gear to rotate therewith. The input entry device includes a pointer initially coinciding with an origin tooth of the primary gear and a sensor to detect movement of the at least one secondary gear. The method includes obtaining answer data provided by the user via manipulation of the at least one secondary gear of the physical input entry device. The method comprises evaluating the answer data and in response thereto presenting to the user one of: (a) a secondary problem within the selected teaching topic when the answer data matches at least one of the secondary solutions for the lead problem; and (b) a second lead problem from a teaching topic other than the selected teaching topic when the answer data matches the optimal solution for the lead problem.

In another embodiment, a method for adaptively teaching content to a user comprises providing a plurality of teaching topics. The method includes sequentially associating a lead problem and a plurality of secondary problems with each of the plurality of teaching topics. Each of the lead problems and the plurality of secondary problems is an open-ended puzzle having a range of solutions and a difficulty rank. The range of solutions for each of the lead problems and the plurality of secondary problems has an optimal solution and a plurality of secondary solutions. A teaching topic is selected and a corresponding lead problem is presented to a user. The user provides answer data which is evaluated. The user is provided another secondary problem from the selected teaching topic if the answer data matches at least one of the secondary solutions. The user is provided another lead problem if the answer data matches the optimal solution.

In yet another embodiment, a method for adaptively teaching content to a user comprises providing a plurality of teaching topics. The method includes associating a lead problem and a plurality of secondary problems with each of the plurality of teaching topics. Each of the lead problems and the plurality of secondary problems is an open-ended puzzle having a range of solutions. The range of solutions for each of the lead problems and the plurality of secondary problems includes an optimal solution and a plurality of secondary solutions. The method comprises selecting a teaching topic and presenting to the user the lead problem associated with the selected teaching topic. The method comprises obtaining answer data provided by the user. The method includes evaluating the answer data and in response thereto presenting to the user one of: (a) a secondary problem from the selected teaching topic when the answer data matches at least one of the secondary solutions for the lead problem; and (b) a second lead problem from a teaching topic other than the selected teaching topic when the answer data matches the optimal solution for the lead problem.

BRIEF DESCRIPTION OF THE SEVERAL
VIEWS OF THE DRAWINGS

Illustrative embodiments of the present disclosure are described in detail below with reference to the attached drawing figures and wherein.

DETAILED DESCRIPTION

A major component of digitally implemented learning systems in mathematics (the field used in this application for illustrative purposes) is the regular provision of problems or puzzles that need to be solved to proceed. It is well established in mathematics education that to be most effective, problems or puzzles must be at the upper limit of a user's ability at that moment—within what is known as the user's zone of proximal development (ZPD). To achieve this aim, the system must constantly monitor the performance of the user to determine, dynamically, what the user's current ability level is, and to select problems or puzzles that keep the user in his or her ZPD. Since mathematical problems or puzzles can be developed on a linear scale of difficulty, doing this is straightforward, and has been implemented on many occasions in different systems. Use of such a liner scale of difficulty can work well in a system that focuses on one particular skill or technique. However, for a learning system that covers a range of topics, there is a tension between ensuring curriculum coverage and maintaining the user in his or her ZPD.

The present disclosure relates generally to the field of cognitive testing and adaptive learning. More specifically, the present disclosure includes a method and system for effectively and efficiently teaching educational content using adaptive learning and open-ended problems or puzzles. The present disclosure monitors an individual's performance while he or she is solving a problem and utilizes adaptive learning to select subsequent problems or puzzles of the requisite level of difficulty. This ensures that the individual is adequately challenged and is kept in his or her ZPD. At the same time, the present disclosure ensures adequate coverage of each offered curriculum by requiring the individual to solve a specific problem from each curriculum; which if solved, demonstrates high degree of proficiency. A variety of problems may be used for the present disclosure in order to suit the education level for each individual. The problems may be represented in the form of a puzzle or may be presented through a variety of mediums. The ideal problem is an open-ended problem that is presented to the individual in the form of a puzzle, a game essentially.

Figure 1:
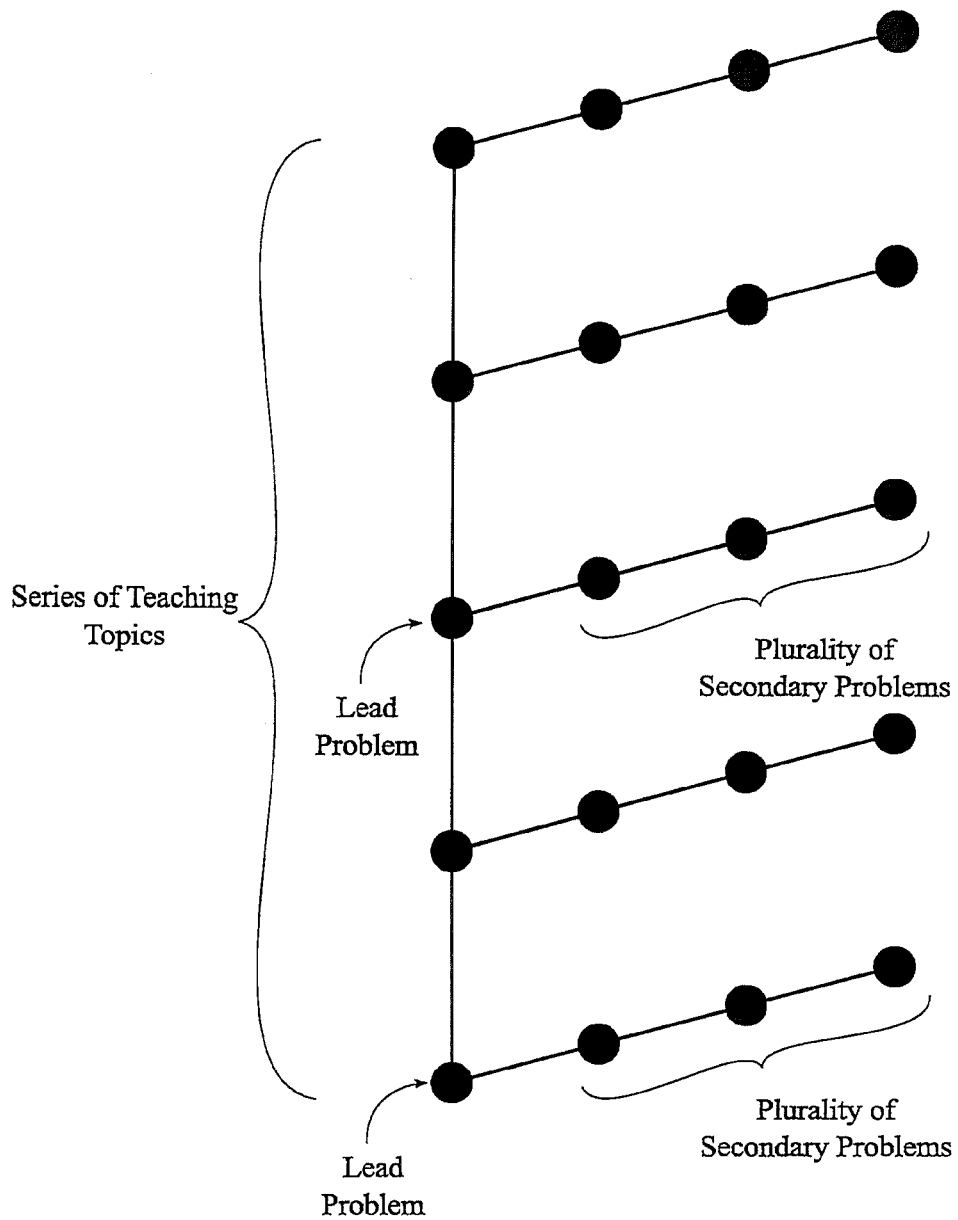
FIG. 1 is a schematic representation of a problem structure employed by a system (shown below in FIG. 13) for adaptively teaching content to a user, in an embodiment.

Referring to FIG. 1, the present disclosure includes a series of teaching topics, wherein each teaching topic includes a lead problem and a plurality of secondary problems (Step A). Each of the teaching topics is associated with a specific curriculum; a curriculum may be focused on a specific concept, puzzle type, theme, or a field of study. For example, one implementation of the present disclosure utilizes different mathematical concepts and problem-solving challenges in order to make up the series of teachings topics. The lead problem and secondary problems for each teaching topic all focus on the same curriculum. Each of the problems is an open-ended problem or puzzle and can be solved in a multitude of ways, with each way being associated with an answer that is satisfactory according to a prescribed measure. More specifically, the lead problem and the secondary problems for each of the teaching topics are associated with an optimal solution and at least one other solution (Step B). The optimal solution may be defined based on the least number of steps used to solve the problem, the highest score attained in solving the problem according to a prescribed scoring system, the exact sequence of steps taken to solve the problem ("solution path"), and/or other similar characteristics. The other solution is any solution other than the optimal solution. The artisan will understand from the disclosure herein that a problem may have two or more optimal solutions (e.g., where the optimal solution is defined based on the least number of steps, two or more solutions may be deemed optimal where they each involve the same (lowest) number of steps). Similarly, the artisan will appreciate that a problem may have two or more solutions other than the optimal solution. Thus, each of the phrases "an optimal solution", "the optimal solution", "other solution", "the other solution", etc., may but need not refer to a solitary solution.

Referring to FIG. 1, in an embodiment of the present disclosure, the series of teachings topics is organized in a tree-like structure, comprising a central trunk and a multitude of branches. The central trunk comprises the lead problems for each of the teaching topics arranged in a linear fashion. Each of the lead problems is further connected to an emanating branch. Each branch comprises the secondary problems associated with the teaching topic of the lead problem. The secondary problems and lead problem for each of the teaching topics is further associated with a difficulty rank that is used to incrementally increase the problem difficulty for the individual. In an embodiment of the present disclosure, the difficulty rank of the lead problem is greater than the difficulty rank of each secondary problem within each of the teaching topics. Thus, the lead problem is used as a test for the associated teaching topic. If the individual can effectively solve the lead problem for a specific teaching topic, then he or she may skip the secondary problems of the specific teaching topic. This allows an individual that has a high level of proficiency to quickly progress through the series of teaching topics to a curriculum that adequately challenges him or her without having to repeat content which he or she has already mastered.

The present disclosure comprises a method and a system. The method delineates the rules and steps necessary to construct a specific path for a user through the series of teaching topics. The specific path is based on the performance of the user and thus is modified after each problem addressed by the user. The system comprises the physical components necessary to execute the method of the present disclosure. The system may comprise a personal computing (PC) device and a physical input entry device discussed further below. The PC device includes a processor and a physical user interface (Step C). As discussed herein, the physical user interface (or the physical input entry device) may be a device not conventionally associated with generic computers. The processor executes the method of the present disclosure in the form of a software application at least in part. The computing device administers the series of teaching topics and the physical input entry device allows the user to interact with the present disclosure to solve and transition through the series of teaching topics. Type of devices that may be used as the PC device include, but are not limited to, desktop computers, laptop computers, smartphones, tablets, and other similar electronic devices. Types of devices usable in the present disclosure as the physical input entry device are discussed further below.

Two important aspects to note for the present disclosure: there are no multiple-choice questions and the user must carry out all key steps of the problem or puzzle with the PC device. This allows the present disclosure to monitor and track every step that the user goes through ("solution path") in order to solve the problem or puzzle, thus providing raw descriptive information relating to the individual's cognitive/solving ability.

Figure 2:
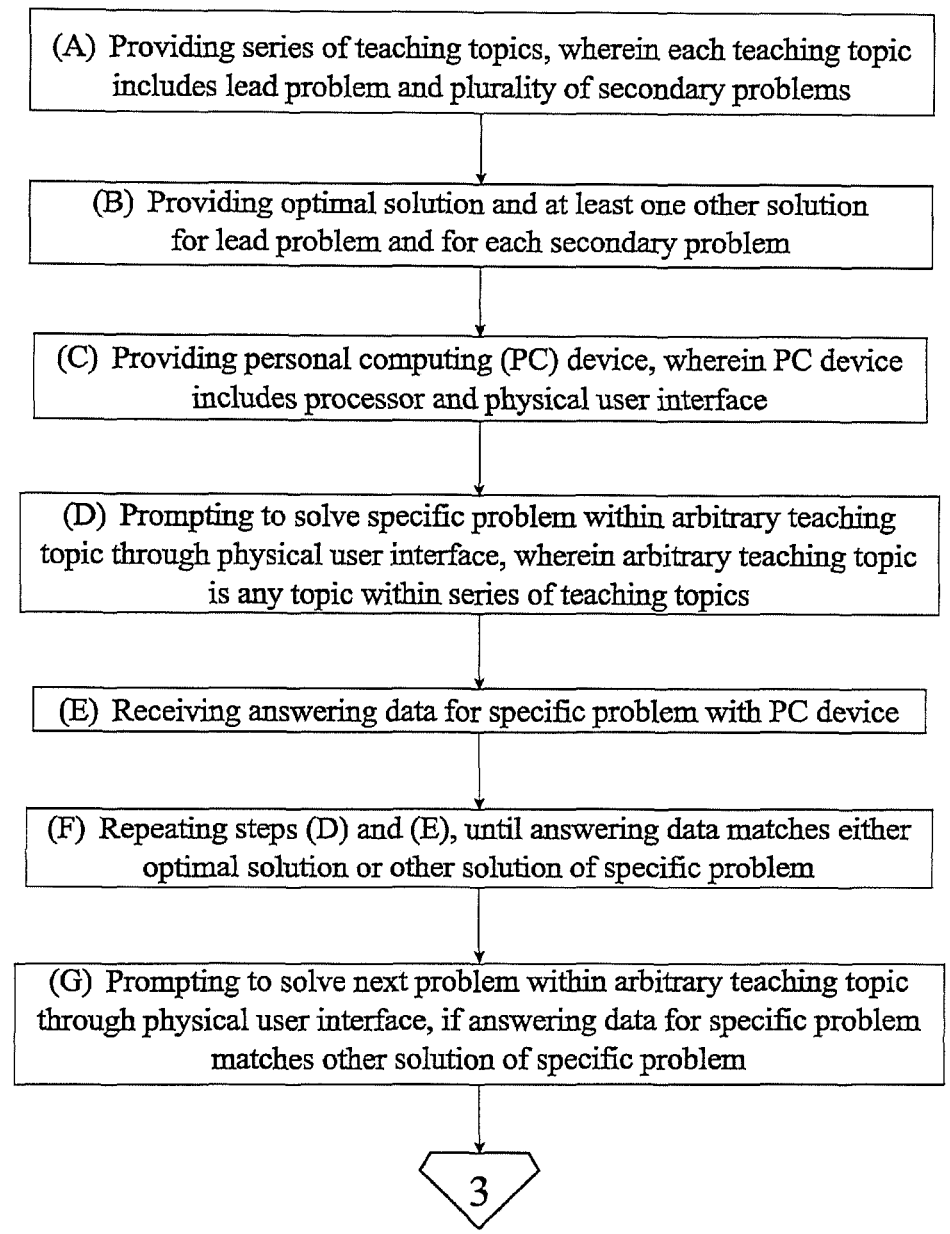
FIG. 2 is a flowchart depicting a high-level operation of the system of FIG. 13, in an embodiment.
Figure 3:
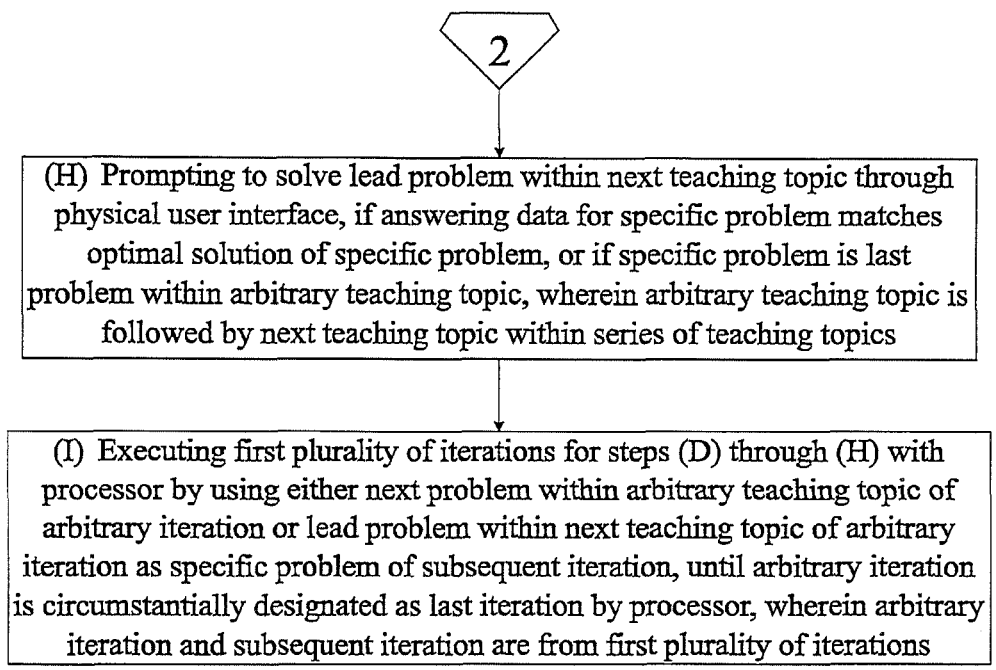
FIG. 3 is another flowchart depicting a high-level operation of the system of FIG. 13, in an embodiment.

Referring to FIG. 2 and FIG. 3, the overall process of the present disclosure begins with the physical user interface prompting to solve a specific problem within an arbitrary teaching topic, wherein the arbitrary teaching topic can be any topic within the series of teaching topics (Step D). The user then attempts to solve the specific problem through the physical user interface. Answering data for the specific problem is received with the PC device (Step E) to be analyzed. If the answering data is not acceptable, then Steps D and E are repeated until the answering data matches either the optimal solution or the other solution of the specific problem. Once a solution for the specific problem is found, the user's performance is analyzed based on which solution was found and, resultantly, directed accordingly through the series of teaching topics.

If the answering data of the specific problem matches the other solution of the specific problem, then the user is directed to solve a next problem within the arbitrary teaching topic; the computing device prompts to solve the next problem within the arbitrary teaching topic (Step G). The other solution for the specific solution indicates average proficiency in the curriculum of the arbitrary teaching topic. In which case, the user is directed to solve the secondary problems from the arbitrary teaching topic in order to practice, achieve mastery, and ensure curriculum coverage before progressing to the next curriculum, i.e. the next teaching topic following the arbitrary teaching topic. In other words, this conditional moves the user through the branch of the arbitrary teaching topic one problem at a time if any solution besides the optimal solution is entered. Alternatively, if the answering data of the specific problem matches the optimal solution of the specific problem, then the user is prompted to solve the lead problem within a next teaching topic through the physical user interface (Step H). The next teaching topic is defined as the teaching topic following the arbitrary teaching topic within the series of teachings topics. In general, identifying the optimal solution for the specific problem signifies that the user has the required degree of solution proficiency for the curriculum associated to the arbitrary teaching topic. Thus, the user is permitted to skip the rest of the problems within the arbitrary teaching topic and jump to the next point in the trunk. This condition endures that the user is kept within his or her ZPD at each step within the series of teaching topics.

Additionally, during Step H, if the specific problem is a last problem within the arbitrary teaching topic, then the user is prompted to solve the lead problem within the next teaching topic, regardless whether the answering data for the specific problem matches the optimal solution or the other solution of the specific problem. Reaching and solving the last problem within the arbitrary teaching topic indicates that the user has reached an acceptable proficiency for the curriculum associated with the arbitrary teaching topic and is thus permitted to move on to the next teaching topic.

Finally, the last step in the overall process of the present disclosure is executing the aforementioned steps for the series of teaching topics. In particular, executing a first plurality of iterations for Steps D through H with the processor by using either the next problem within the arbitrary teaching topic of an arbitrary iteration or the lead problem within the next teaching topic of the arbitrary iteration as the specific problem of a subsequent iteration (Step I). This is executed until the arbitrary iteration is circumstantially designated as a last iteration by the processor. The arbitrary iteration and the subsequent iteration are from the first plurality of iterations. Each of the first iterations is Step D through H being executed for a particular problem; the particular problem is dependent on the user's real-time performance and knowledge/proficiency of the curriculum being addressed.

Figure 6:
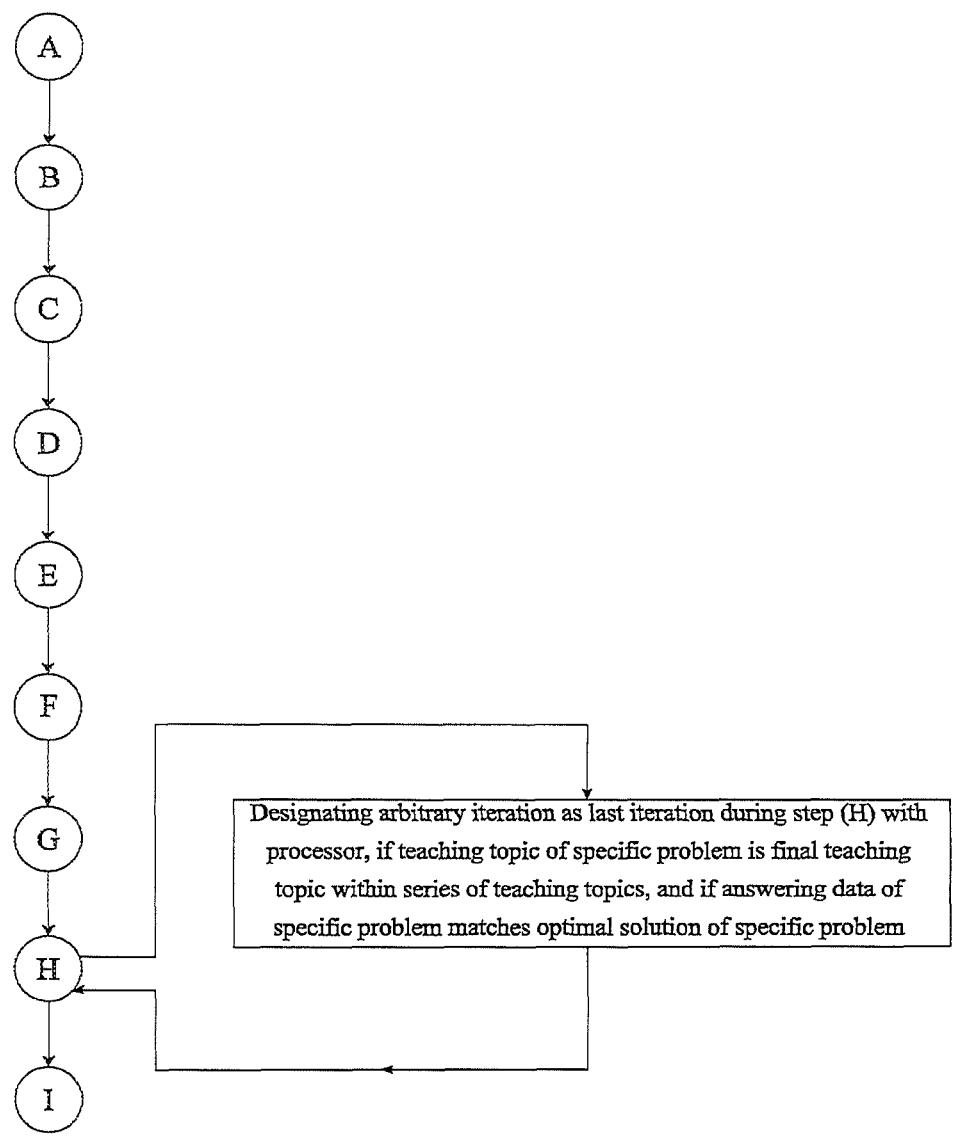
FIG. 6 is a flowchart depicting a process used by the system of FIG. 13 to designate a final iteration of the teaching process.

The overall process of the present disclosure is executed until the user demonstrates adequate proficiency in every teaching topic. In relation to the overall process, this is the case when the arbitrary iteration is designated as the last iteration. One such instance is when the user shows adequate proficiency in a final teaching topic by solving one of the problems from the final teaching topic with the optimal solution of said problem; wherein the final teaching topic is the last topic within the series of teaching topics. Referring to FIG. 6, the user is finished if the following conditions are met: (1) the teaching topic of the specific problem is the final teaching topic; and (2) the answering data for the specific problem matches the optimal solution of the specific problem. If these conditions are met, then the arbitrary iteration is designated as the last iteration during Step H with the processor. Thus, indicating that the user has mastered the curriculum of the final teaching topic and, resultantly, has finished the series of teaching topics.

Figure 7:
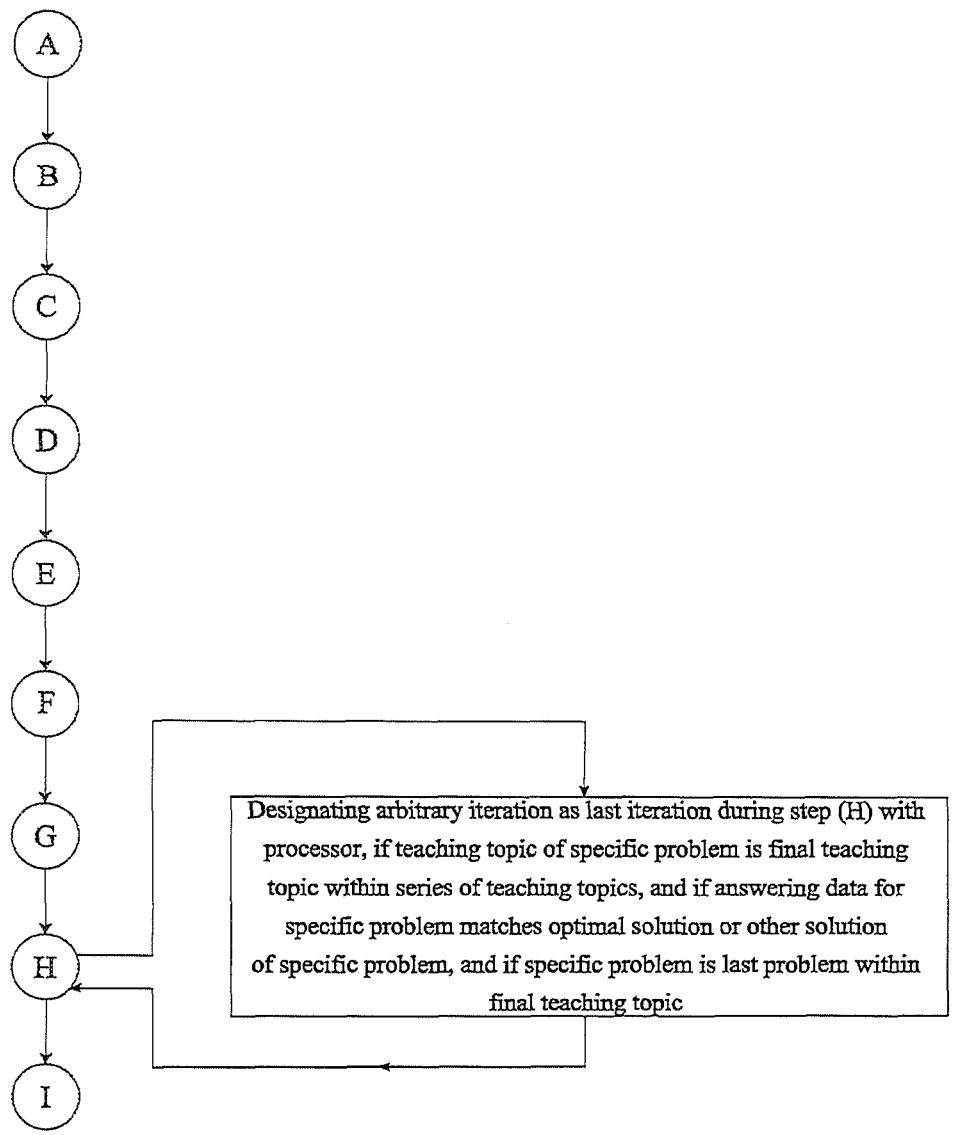
FIG. 7 is a flowchart depicting another process used by the system of FIG. 13 to designate a final iteration of the teaching process.

Another instance is when the user has reached and solved a last problem within the final teaching topic. Referring to FIG. 7, in relation to the overall process, the user is finished if the following conditions are met: (1) the teaching topic of the specific problem is the final teaching topic; (2) the answering data for the specific problem matches either the optimal solution or the other solution of the specific problem; and (3) the specific problem is the last problem within the final teaching topic. If these conditions are met, then the arbitrary iteration is designated as the last iteration during Step H by the processor, and the user finishes the series of teaching topics.

Figure 4:
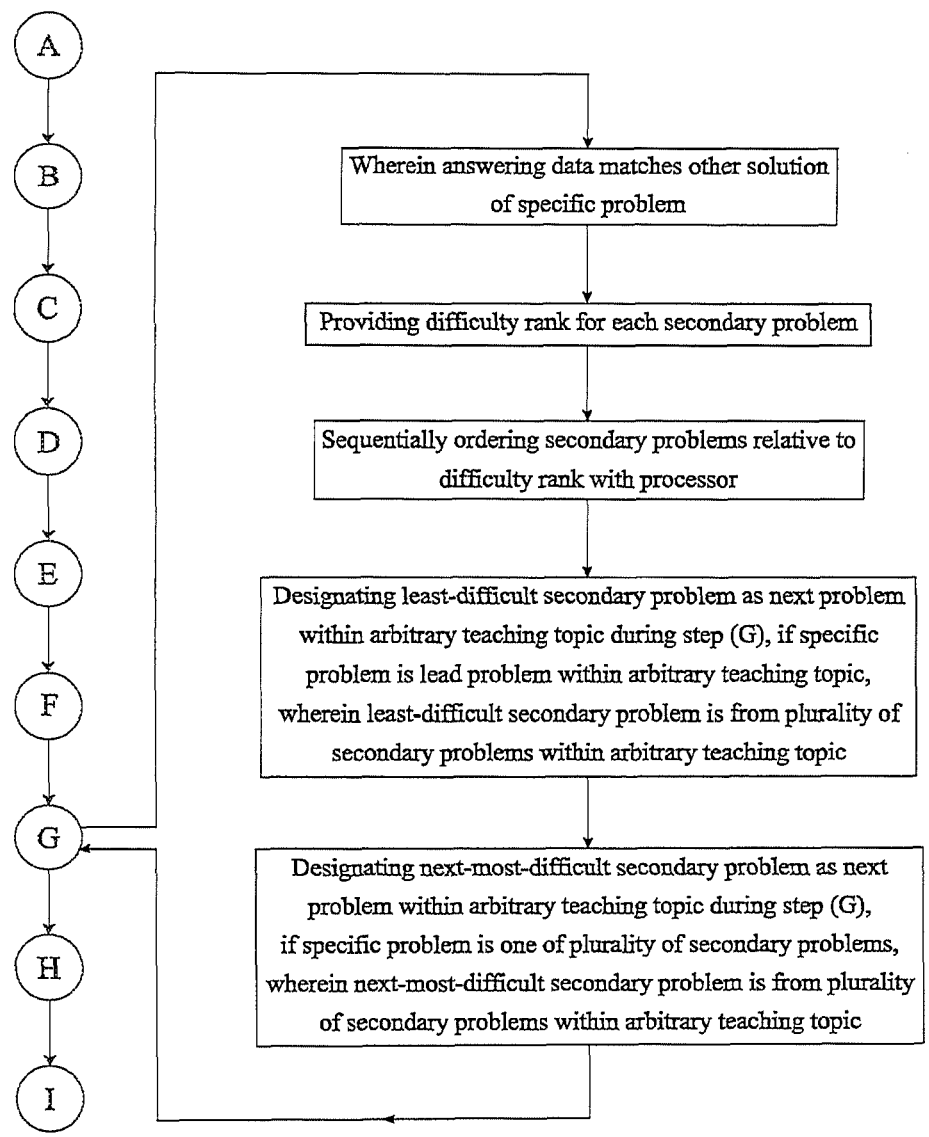
FIG. 4 is a flowchart outlining a method used by the system of FIG. 13 to determine whether the user's answering data matches a solution to a problem presented to the user.
Figure 5:
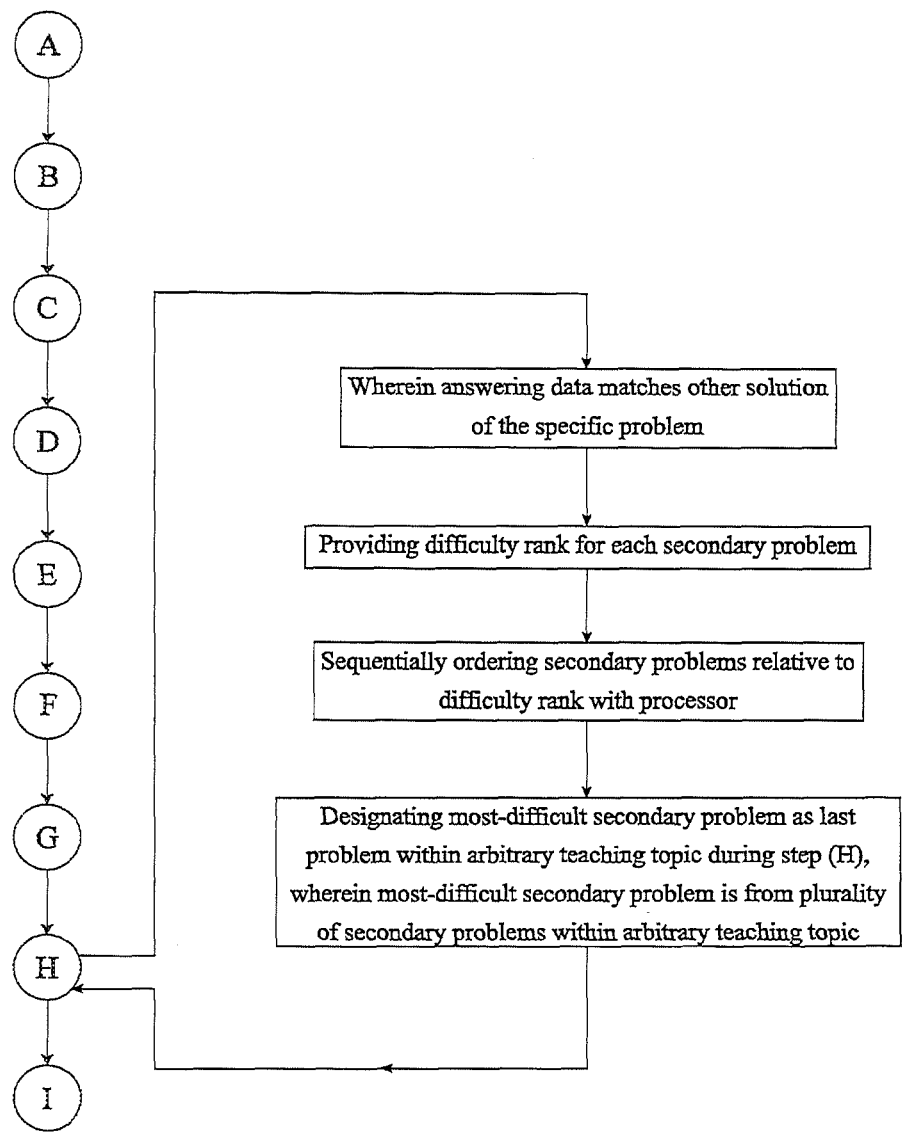
FIG. 5 is a flowchart outlining a method used by the system of FIG. 13 to determine whether the user's answering data matches an optimal solution to the problem.

Referring to FIG. 4, if the user finds the other solution for the specific problem, then he or she may be directed onto two different paths. The determining factor is if the specific problem is either the lead problem or one of the secondary problems. Prior to directing the user, the processor first sequentially orders the secondary problems relative to the difficulty rank such that the user is incrementally exposed to harder and harder problems. If the specific problem is the lead problem, then the user is directed to solve the secondary problems within the arbitrary teaching topic. More specifically, a least-difficult secondary problem is chosen and designated as the next problem within the arbitrary teaching topic during Step G, wherein the least-difficult secondary problem is from the plurality of secondary problems within the arbitrary teaching topic.

Alternatively, if the specific problem is one of the plurality of secondary problems, then the user is directed to solve the problem after the specific problem within the arbitrary teaching topic. In particular, a next-most-difficult secondary problem is designated as the next problem within the arbitrary teaching topic during Step G. The next-most-difficult secondary problem is from the plurality of secondary problems within the arbitrary teaching topic. Furthermore, it is important to note that the last problem referenced in Step H is the final problem within the arbitrary teaching topic. More specifically, a most-difficult secondary problem is designated as the last problem during Step H; wherein the most-difficult secondary problem is from the plurality of secondary problems within the arbitrary teaching topic. The final problem is the most difficult in order to test the user in the curriculum of the arbitrary teaching topic.

Figure 8:
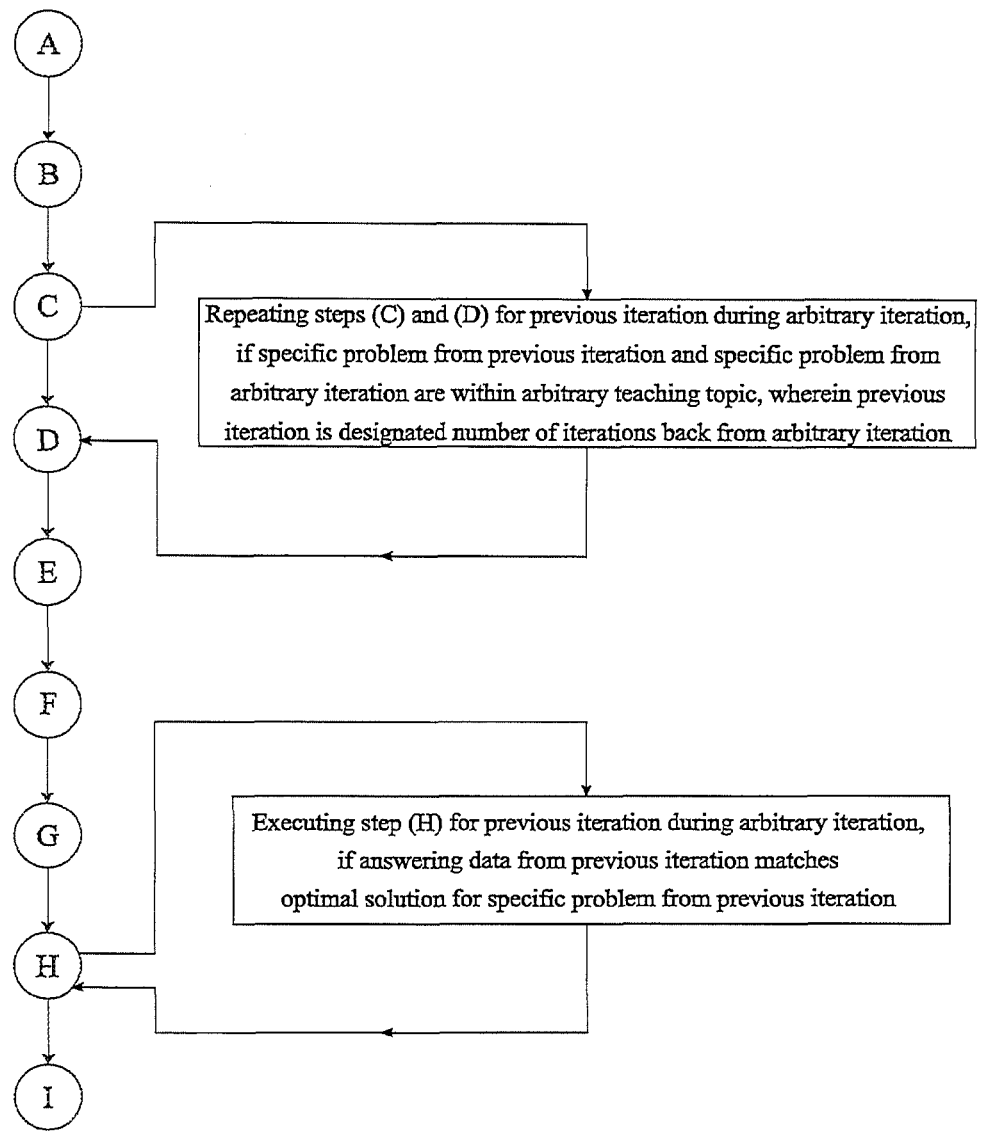
FIG. 8 is a flowchart depicting another process used by the system of FIG. 13.

Referring to FIG. 8, anytime during the overall process of the present disclosure the user is able to return to previously addressed problems and attempt to find a different solution, in particular, the optimal solution. In relation to the overall process, step C and step D may be repeated for a previous iteration during the arbitrary iteration, if the specific problem from the previous iteration and the specific problem from the arbitrary iteration are within the arbitrary teaching topic, wherein the previous iteration is a designated number of iterations back from the arbitrary iteration. The designated number of iterations is set by an administrator account. Any problems further back than the designated number of iterations will not award the user with the ability to skip to the next teaching topic if he or she identifies the optimal solution. In alternative embodiments of the present disclosure, the user may cross to previous topics in order to repeat problems. If the user matches the answering data from the previous iteration to the optimal solution for the specific problem from the previous iteration, then the system executes step H for the previous iteration during the arbitrary iteration.

Figure 9:
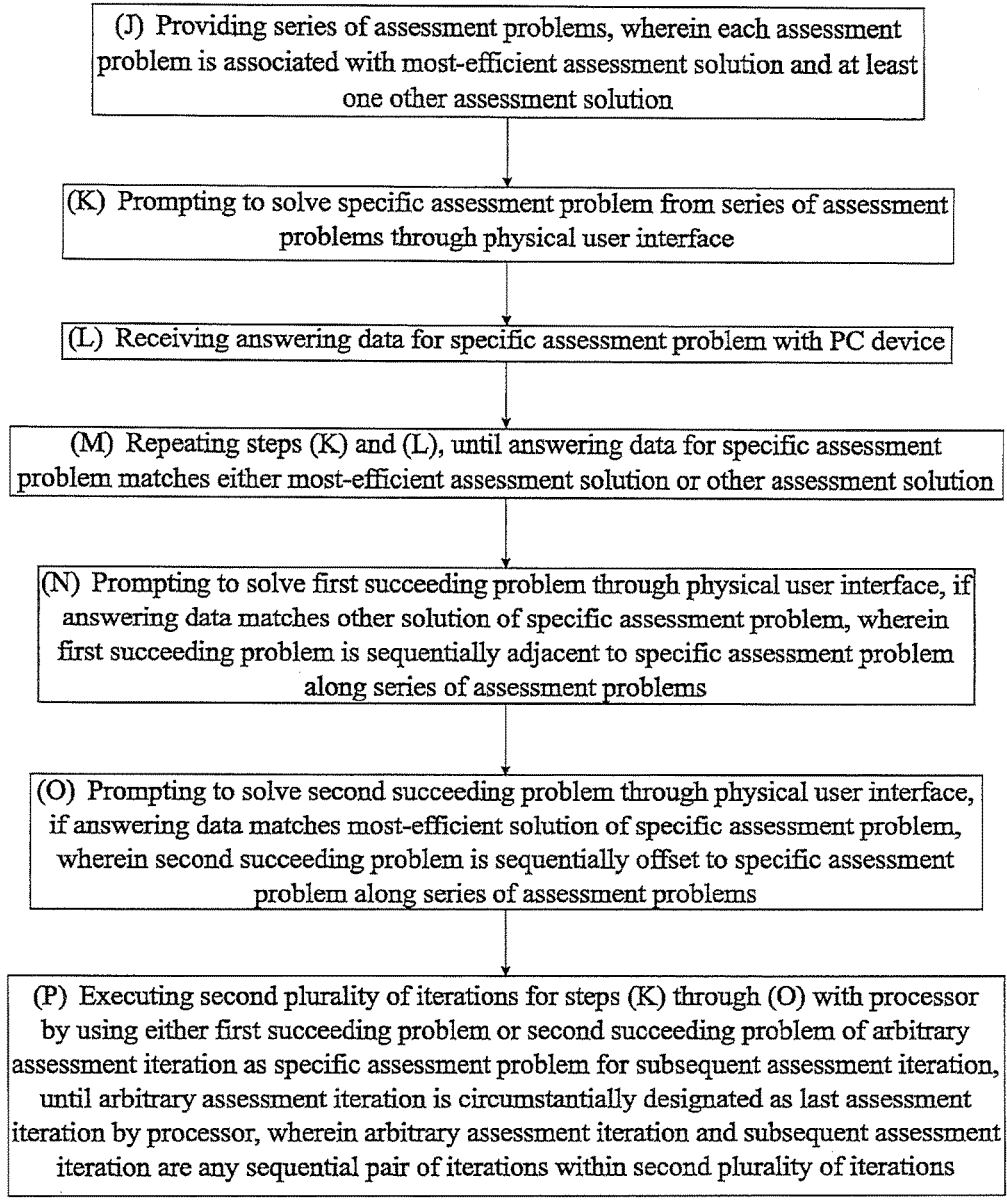
FIG. 9 is a flowchart depicting a process used by the system of FIG. 13 to make an initial assessment of the competencies of the user.

Referring to FIG. 9, prior to allowing the user to solve the series of teachings topics, the present disclosure first requires the user to pass through an entry module. The entry module provides a rapid assessment of the user's ability and proficiency regarding the curriculums within the series of teaching topics. The results from the entry module are used to place the user within the series of teaching topics accordingly. For example, weak users are placed at an initial topic from the series of teaching topics while stronger users may be allowed to skip a number of early topics.

The entry module includes a series of assessment problems, wherein each assessment problem is associated with an optimal assessment solution and at least one other assessment solution, similar to the overall process (Step J). The series of assessment problems is populated with questions, problems, or puzzles of different curriculums, thus allowing the system to fully determine the user's abilities. Additionally, the assessment problems may be easier than the problems from the series of teaching topics. The process for the entry module is similar to the overall process of the present disclosure. First, the user is prompted to solve a specific assessment problem from the series of assessment problems through the physical user interface (Step K). Next, the user solves the specific assessment problem through the physical input entry device. The system receives answering data for the specific assessment problem (Step L). Steps K and L are repeated until the answering data for the specific assessment problem matches either the optimal assessment solution or the other assessment solution of the specific assessment problem. The user's path through the assessment problems is partially adaptive, i.e. the path is dependent on the user's performance.

If the answering data matches the other assessment solution of the specific assessment problem, then the user is incrementally moved to the next problem within the series of assessment problems. In particular, the user is prompted to solve a first succeeding problem through the physical user interface, wherein the first succeeding problem is sequentially adjacent to the specific assessment problem along the series of assessment problems (Step N). This is similar to the overall process.

If the answering data matches the optimal assessment solution of the specific assessment problem, then the user is moved forward through the series of assessment problems a pre-set number of steps. In particular, the user is prompted to solve a second succeeding problem through the physical user interface, wherein the second succeeding problem is sequentially offset from the specific assessment problem along the series of assessment problems (Step O). The offset, the number of steps, may vary depending on the specific assessment problem, the type of educational content, type of problems, or type of puzzles used for the present disclosure.

The user is maintained within the entry module until he or she reaches and solves a final problem within the series of assessment problems. More specifically, the processor executes a second plurality of iterations for Steps K through O by using either the first succeeding problem or the second succeeding problem of an arbitrary assessment iteration as the specific assessment problem for a subsequent assessment iteration. The second plurality of iterations is executed until the arbitrary assessment iteration is circumstantially designated as a last assessment iteration by the processor. The arbitrary assessment iteration and the subsequent assessment iteration are any sequential pair of iterations within the second plurality of iterations.

Figure 12:
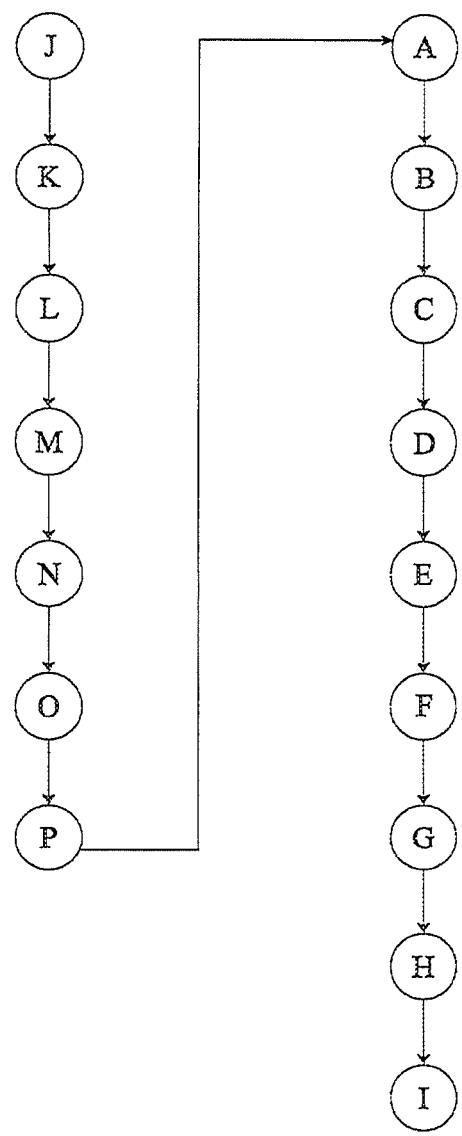
FIG. 12 is a flowchart depicting the workings of an entry module of the system of FIG. 13.

Referring to FIG. 12, the present disclosure utilizes performance data from the entry module to determine where in the series of teaching topics the user should be placed. In order to achieve this, performance criteria are provided for each of the teaching topics. The performance criteria quantify a minimum proficiency/ability necessary to solve problems within the associated teaching topic. Once the user completes the entry module, the processor assesses a performance score for each of the second plurality of iterations.

A variety of scoring methods may be used for determining the performance score. Then, the performance score for each of the second plurality of iterations is compiled into an overall performance score with the processor. The overall performance score is then compared to the performance criteria for each teaching topic with the processor in order to identify a set of matching topics from the series of teaching topics. The set of matching topics is the teaching topics within the series of teaching topics which the user has shown proficiency in and therefore does not need to solve. This ensures that the problems addressed by the user in the overall process of the present disclosure are within his or her ZPD.

Figure 10:
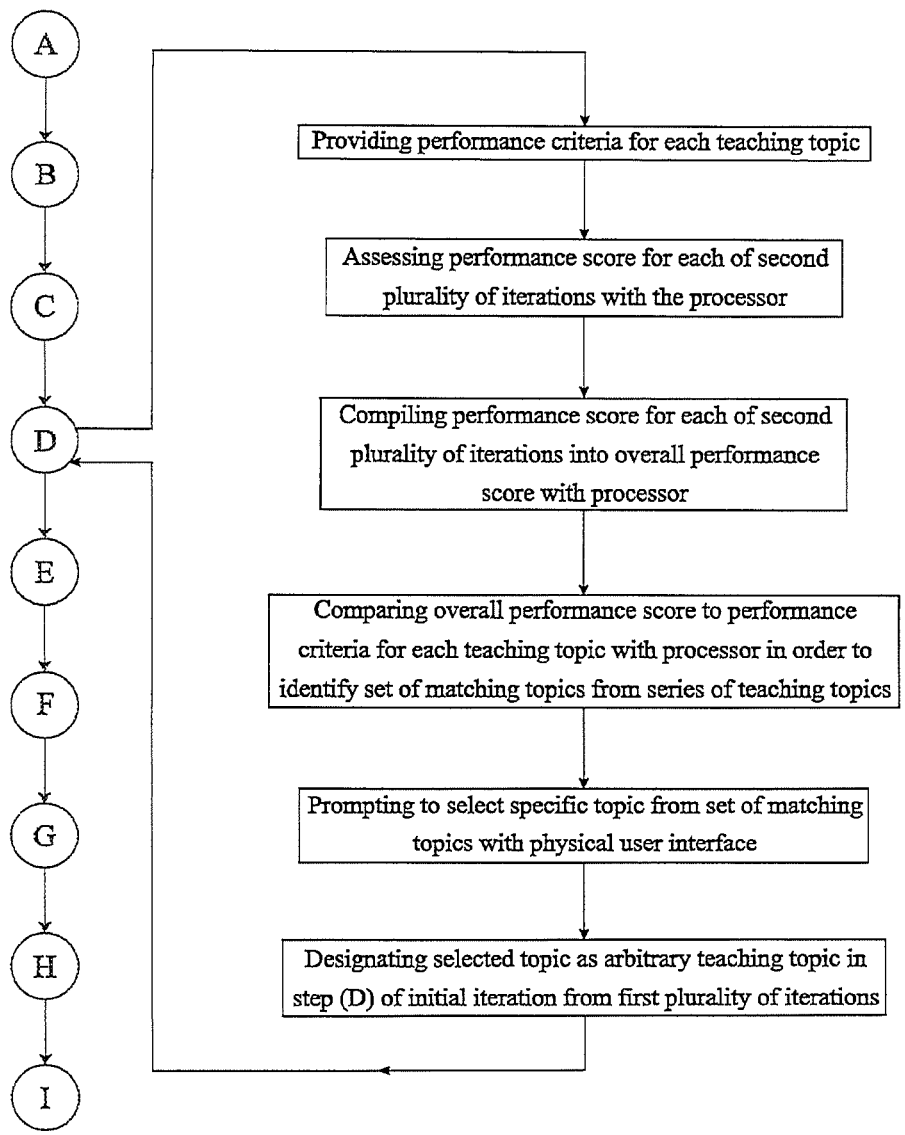
FIG. 10 is a flowchart depicting a process used by the system of FIG. 13 to analyze performance scores of the user so as to place the user within a particular teaching topic from a series of teaching topics.
Figure 11:
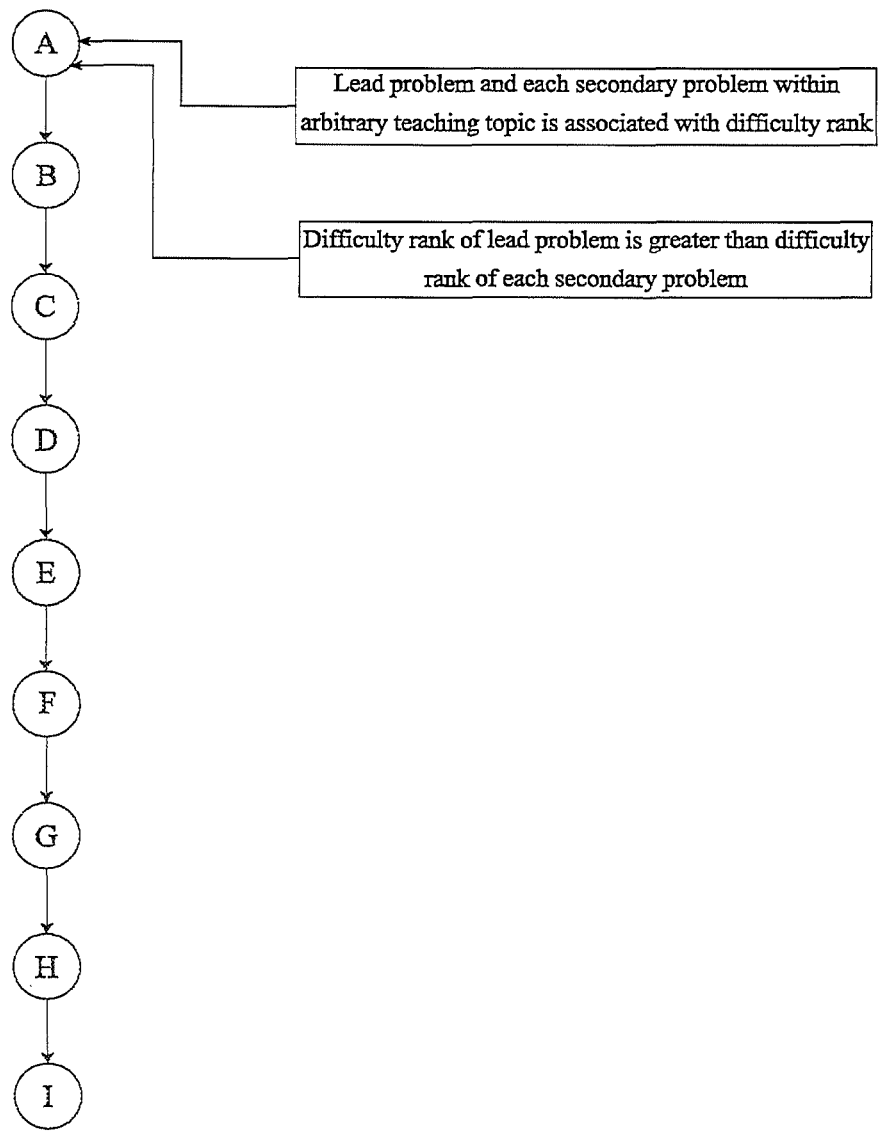
FIG. 11 is a flowchart depicting a process used by the system of FIG. 13 to ensure adequate curriculum coverage for the user.

Once identified, the set of matching topics is then displayed to the user for selection. Referring to FIG. 10, the physical user interface prompts the user to select a specific topic from the set of matching topics. Once chosen, the selected topic is designated as the arbitrary teaching topic in Step D of an initial iteration from the first plurality of iterations. This process assesses the user's ability and places him or her accordingly within the series of teaching topics.

In one embodiment, the present disclosure also includes a basics module, essentially a training area (also referred to herein as a tutor module). If at any point the system identifies that the user is struggling to solve a problem, then he or she may be directed towards the basics module. In one embodiment, certain problems within the entry module are dedicated to separating users with strong and weak abilities. The basics module tutors the user through basic elements utilized in the problems within the series of assessment problems and the series of teaching topics. In order for the user to exit the basics module, the user must complete all the problems and tasks within the basics module. Although, there is a one-time exit opportunity, if the user solves the first predetermined number of problems within the basics module by finding the optimal solution in a single try for each one, then the user may exit the basic module.

In an embodiment, a system for teaching content using an adaptive engine may include one or more computing devices coupled to one or more input entry devices (also referred to herein as an "interface device"). The input entry device coupled to the computing device(s) may be a physical device other than a conventional computer component, such as a keyboard, mouse, a touchscreen display, etc. For example, in embodiments, the input entry device may be a physical device that includes rotatable gears enmeshed with each other. Or, for instance, the physical input entry device may comprise pieces of a puzzle that can be arranged in predefined patterns. In these embodiments, the user may use the physical input entry device to solve one or more problems (e.g., puzzles or other problems) displayed elsewhere, e.g., on a display of the computing device. The computing device may evaluate the inputs provided by the user via the physical input entry device and, based on this evaluation, adaptively select the next problem to be presented to the user. As discussed above, and depending on the user input, the next problem presented to the user may be a problem within the same teaching topic or a different teaching topic (e.g., a lead problem of a different teaching topic).

Figure 13:
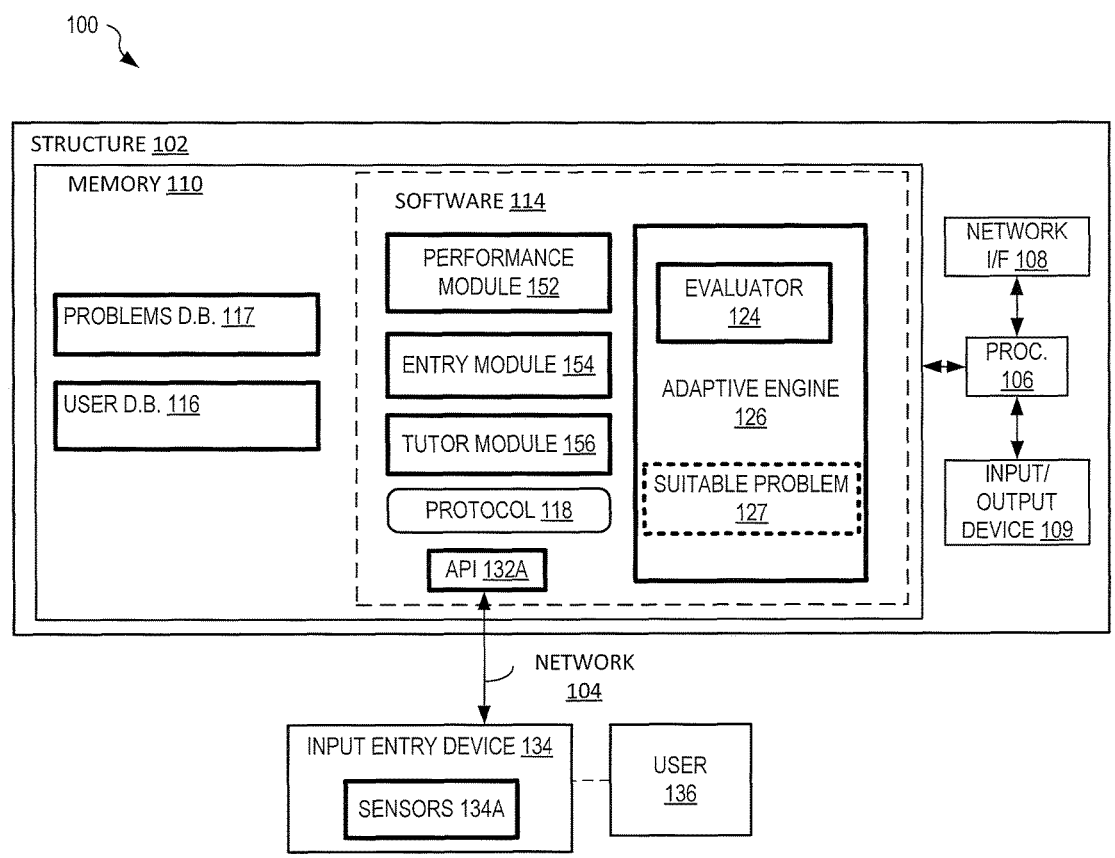
FIG. 13 is a schematic representation of the system for adaptively teaching content to the user, in an example embodiment.

FIG. 13 shows an example system 100 for teaching content using an adaptive engine and a physical input entry device, as discussed herein. The system 100 may include a structure 102. The structure 102 may be a computer, a server, a network of computer servers, etc., and is shown with a processor 106 communicatively coupled to a network interface 108, an input/output device 109, and a memory 110. Processor 106 represents one or more digital processors. Network interface 108 may be implemented as one or both of a wired network interface and a wireless network interface, as is known in the art. The input/output device 109 may include any suitable input/output device, such as a display, speakers, a keyboard, a mouse, a touchscreen, etc. Memory 110 represents one or more of volatile memory (e.g., RAM) and non-volatile memory (e.g., ROM, FLASH, magnetic media, optical media, et cetera). Although shown within structure 102, memory 110 may be, at least in part, implemented as network storage that is external to structure 102 and accessed via network interface 108.

Software 114, a user database 116, and a problems database 117 may be stored within a transitory or non-transitory portion of the memory 110. Software 114 includes machine readable instructions that are executed by processor 106 to perform the functionality of structure 102 as described herein. The user database 116 may include a plurality of records, each pertaining to one of a plurality of users. For example, the user database 116 may include a listing of lead problems attempted and/or solved by each user, a listing of secondary problems attempted and/or solved by each user, and other such user-specific information. The user database 116 may, in embodiments, be omitted.

The problems database 117 may include a database of lead problems and associated secondary problems, such as mathematical problems or puzzles, or other problems, arranged for example by teaching topic, concept type, puzzle type, theme, field of study, etc. The problems database 117 may further include each or at least a plurality of solutions for each problem, including the optimal solution thereof, together with a difficulty rank for each problem. The software 102 may be configured to present a user a lead problem, and subsequently, another lead problem or a secondary problem associated with the original lead problem, based on an input provided by the user via the input entry device (as discussed herein).

The online structure 102, using protocol 118 and Application Programming Interface 132A, may communicate over a wired or wireless network 104 with an input entry device 134 of a user 136. The user 136 may be any individual (or in embodiments, group of individuals) who are being educated and/or evaluated using the system 100 described herein.

Network 104, which is formed in part by one or more of the Internet, wireless networks, wired networks, local networks, and so on, facilitates communication between the structure 102 and the input entry device. The user 136 views a problem presented by the software 114 on the input/output device 109, e.g., a display of or associated with the online structure 102, and in response thereto, utilizes the input entry device 134 to solve the presented problem. The software 114 evaluates the input provided by the user 136 and, based on this evaluation, presents on the output device 109 another lead problem or a secondary problem having a different difficulty rank. The input entry device 134 may include one or more sensors 134A to allow for relevant interaction of the user 136 with the components of the input entry device 134 to be communicated to the software 114 (e.g., motion and/or rotation detecting sensors such as optical and/or magnetic sensors, pressure detecting sensors, temperature sensors, weight sensors, etc.). In embodiments, the input entry device 134 may also include one or more processors or other such devices to allow for the output of the sensors 134A to be evaluated. In other embodiments, the input entry device 134 may be devoid of a processor or other comparable device and the adaptive engine 126 may be configured to decipher the output of the sensors 134A.

While the structure 102 is shown as having a solitary input entry device 134 coupled thereto, in embodiments, the structure 102 may have a multitude of input entry devices 134 in communication therewith (e.g., the structure 102 may be in communication with a statistically significant number (such as hundreds of thousands) of input entry devices 134). In these embodiments, each of the plurality of input entry devices 134 may be associated with a unique user. The user, e.g., the user 136, may also couple his or her input entry device 134 with the structure 102 indirectly. For example, in embodiments, the structure 102 may be an online structure (e.g., may be a webserver) and each user may interact therewith by coupling their respective input entry device 134 to their personal (or other) computer which is in-turn coupled to the structure 102. In embodiments, the system 100 may be a dedicated device (e.g., may be configured to effectuate only the purposes described herein).

The software 114 may include an adaptive engine 126. The adaptive engine 126 may include an evaluator 124. The adaptive engine 126 may initially present to the user 136 a lead problem associated with a particular topic via the input/output device 109. The user 136 may use the input entry device 134 in an attempt to solve this lead problem. The user's input may be communicated to the structure 102 as answering data, and the evaluator 124 thereof may evaluate the answering data to determine if the answering data includes or otherwise corresponds to the optimal solution. If so, the evaluator 124 may subsequently present to the user 136 via the input/output device 109 a suitable problem 127 which is associated with a different teaching topic (see FIG. 1). Alternately, if the input provided by the user 136 via the input entry device 134 includes a non-optimal solution, the evaluator 124 may present to the user 136 the suitable problem 127 which, in this case, may be a secondary problem associated with the same teaching topic.

In embodiments, the software 114 may also include a performance module 152, an entry module 154, and a tutor module 156. As is apparent from the disclosure herein, the adaptive engine 126, together with the performance module 154, may monitor the user's performance 136 to ensure that problems are presented to the user 136 so as to adequately challenge the user 136 while keeping the user 136 in his or her ZPD. The entry module 154, also discussed above, may together with the adaptive engine 126 initially present to the user 136 a series of assessment problems to allow the evaluator 124 to obtain a baseline assessment of the user's mastery over the teaching curriculum. The tutor module 156, also referred to as a basics module above, may be configured to tutor the user 136, e.g., by teaching him or her about the basic elements of a teaching topic, based on a determination that the user 136 is struggling to solve the presented problem.

As discussed above, the adaptive engine 126 may adaptively determine the suitable problem 127 based on the input provided by the user 136 via the input entry device 134. In embodiments, when determining the suitable problem 127 to be presented to the user 136, the adaptive engine 126 may also take into account inputs provided by other users. For example, where inputs from a multitude of users indicate that a particular problem within a teaching topic is easier to solve than the preceding problem in that topic, the adaptive engine 126 may, based on these inputs, adaptively change the difficulty rank of these problems in the problems database 117. The artisan will understand that in so doing the system 100 may benefit from a statistically significant number of users 136 (for instance, it may be more beneficial to adaptively change the difficulty rank of a problem based on the input of many thousands of users as compared to changing the difficulty rank of a problem based on the input of two or three users). Thus, use of a statistically significant number of users may facilitate optimal operation of some embodiments of the system 100.

Workings of the disclosure will now be illustrated with an example. The artisan will understand that the example is not intended to be limiting.

Figure 14:
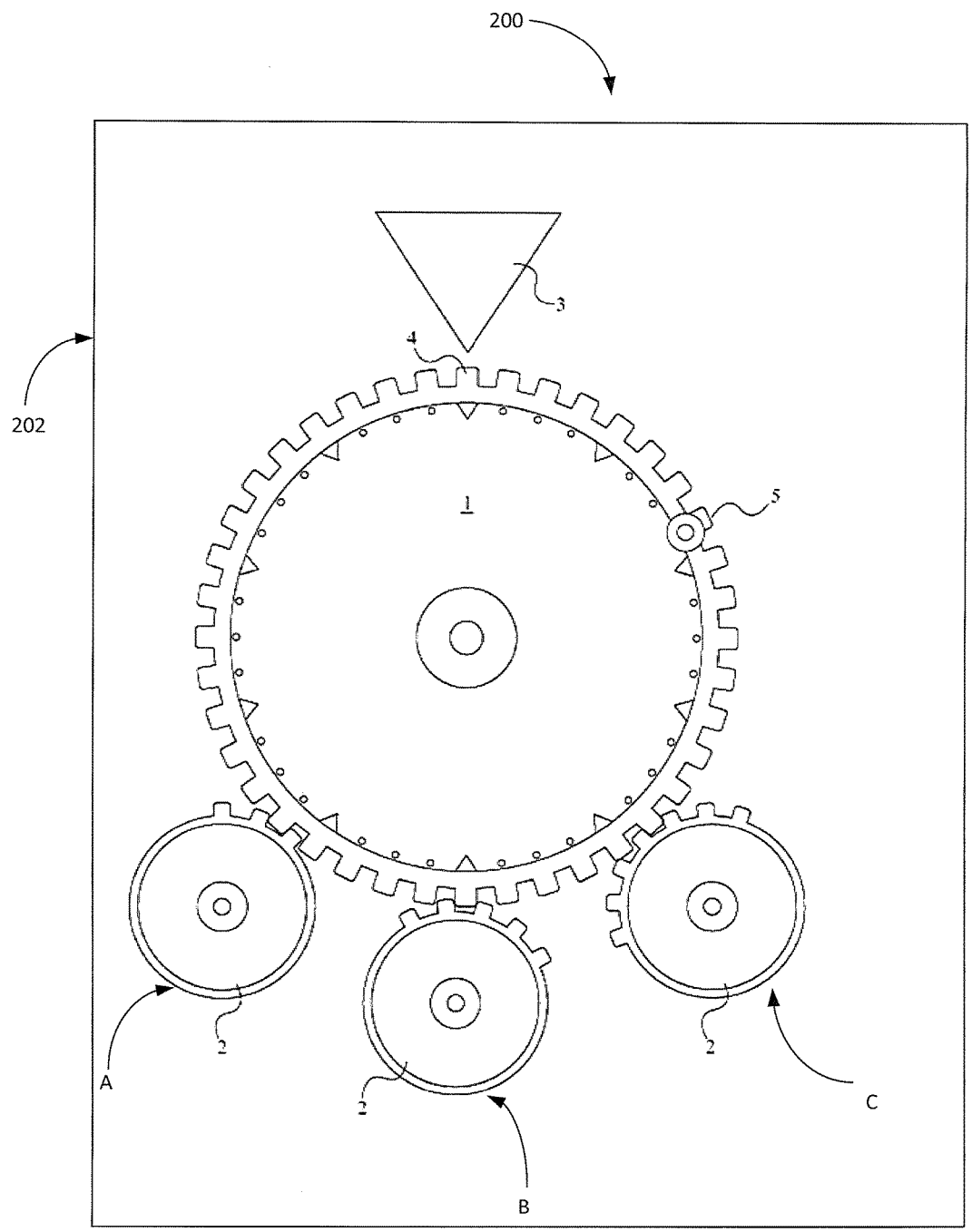
FIG. 14 is a schematic representation of one example of a physical input entry device of the system of FIG. 13, in an embodiment.

Focus is directed to FIG. 14 which shows an input entry device 200. This input entry device 200 is but one example of the input entry device 134. The input entry device 200 is modeled after the gear system in U.S. patent application Ser. No. 14/833,037 filed Aug. 21, 2015, which, as noted above, is incorporated by reference herein. The '037 Application illustrates the workings of the physical gear system in detail, but discusses the physical gear system as a stand-alone device. A primary difference between the physical gear system disclosed in the '037 Application and the physical gear system 200 is that the gear system 200 is communicatively coupled to the structure 102, as illustrated in FIG. 13 via the input entry device 134. The physical input entry device (or gear system) 200 is described herein to illustrate use of the system 100 for teaching mathematical content, and particularly, algebraic equations, using the adaptive engine 126. The artisan will understand that while mathematical content is used as an example to illustrate the workings of the system 100, that the system 100 may likewise be used to adaptively teach other content to users (e.g., the user 136). The disclosure below first details the example input entry device 200, and then outlines an example use of the input entry device 200 in the system 100 to teach content to the user 136 adaptively.

The physical gear system 200 visually represents each entity of an algebraic equation and allows the user 136 to manipulate said entities through the individual gears of the gear system in order to determine a solution to the algebraic equation. Entities of the algebraic equation include a plurality of terms and at least one numerical constant, wherein one side of the equation is the plurality of terms and the other side of the algebraic equation is at least one numerical constant. Each of the plurality of terms includes a coefficient and a variable. The variable is a symbol that represents an undefined value within the algebraic equation, while the coefficient is a constant number which multiples or amplifies the variable. Solving the algebraic equation includes identifying a value for each of the variables, which would balance the two sides of the algebraic equation.

The illustrated input entry device 200 includes a primary cog 1, a plurality of secondary cogs 2, and a fixed pointer 3. The primary cog represents a range of solutions for the algebraic equation and includes a plurality of teeth that is quantitatively greater than the numerical constant. For example if the numerical constant is 20, than the number of teeth on the primary cog would need to be greater than 20. The plurality of teeth for the primary cog includes an origin tooth 4 and a target tooth 5, each marked accordingly.

The origin tooth marks a starting point that the user 136 may reference in order to identify the remaining teeth within the plurality of teeth, essentially representing the zero value. The target tooth represents the numerical constant of the algebraic equation. The target tooth is quantitatively offset from the origin tooth by the numerical constant, thus visually displaying the numerical constant as a radial increment on the primary cog. Additional teeth may be marked on the primary cog to indicate their respective offset quantity from the origin tooth. In one embodiment, each tooth on the primary cog is marked with a respective offset quantity from the origin tooth. Alternatively, every incremental tooth may be marked.

The plurality of secondary cogs represents the side of the algebraic equation relating to the plurality of terms. Each of the plurality of secondary cogs is associated with a corresponding term from the plurality of terms. This relationship is conveyed to the user by quantitatively matching a plurality of teeth on each secondary cog to the value of the coefficient of its corresponding term. For example, if the corresponding term is "4x", then the secondary cog representing this particular term would have four teeth. Each of the secondary cogs may be marked with a readable label that depicts the coefficient of the corresponding term, in turn conveying to the user the number of teeth present on said secondary cog. Each of the secondary cogs is designed to mesh with and engage the primary cog such that rotation of each of the plurality of secondary cogs is used to drive the rotation of the primary cog. This includes matching the size and type of the teeth used for each of the plurality of secondary cogs to that of the primary cog; a variety of types of teeth may be used for the primary cog and thus the secondary cogs. As discussed herein, because the number of teeth of each of the three secondary cog 2 is disparate, a full rotation of each secondary cog 2 will cause the primary cog to move by different amounts.

The fixed pointer indicates the current output for the input entry device 200, wherein the output corresponds to the side of the algebraic equation associated with the numerical constant. Additionally, the fixed pointer is used to zero/reset the gear system prior to solving the algebraic equation. The gear system 200 is zeroed by positioning the origin tooth coincident with the fixed pointer. The fixed pointer is preferably shaped similar to an arrowhead and is positioned adjacent to the primary cog, oriented towards the center of the primary cog.

In general, the method for solving the algebraic equation involves aligning the target tooth at the fixed pointer, thus setting the current output of the primary cog to be the numerical constant. This is accomplished by first identifying a current tooth at the fixed pointer, wherein the current tooth is any one of the plurality of teeth on the primary cog. If the current tooth is not the origin tooth, then the primary cog is rotated until the origin tooth is set at the fixed pointer, essentially calibrating or resetting the input entry device 200. Once the device 200 is reset, a plurality of rotations with one or more of the plurality of secondary cogs is then executed in order to rotate the primary cog so that the target tooth aligns with the fixed pointer. This alignment between the target tooth and the fixed pointer yields a possible solution for the algebraic equation. The potential solution lies in the number of rotations executed for each of the secondary cogs. For example, two rotations of the secondary cog that is associated with the term "4x" translates to the variable "x" being two. Once the target tooth is aligned with the fixed pointer, then the plurality of rotations is quantitatively identified for each of the secondary cogs as a potential solution for the variable of the corresponding term. The rotation direction of each of the secondary cogs represents either an increase or decrease in value for the variable of the corresponding term. A clockwise rotation by the secondary cog represents a quantitative increment in the potential solution of the variable for the corresponding term. Similarly, a counterclockwise rotation by the secondary cog represents a quantitative decrement in the potential solution of the variable for the corresponding term. For example, rotating one of the secondary cogs three turns clockwise and two turns counterclockwise means the value for the variable of the corresponding term is one.

Positioning the target tooth at the fixed pointer yields a solution for the algebraic equation, wherein the solution includes a potential solution for each of the variables, for each of the terms. However, this solution is only one of many possible solutions for the algebraic equation. The most optimal solution in this example is achieved by minimizing the collective rotations of the secondary cogs 2. The least amount of rotations for each of the plurality of secondary cogs represents the most efficient and optimal solution for the algebraic equation.

The input entry device 200 may also be used to solve the algebraic equation for a plurality of numerical constants, which is also known as a system of equations. Solving for the numerical constants includes repeating the aforementioned method a multitude of times. That is, each of the iterations is executed in order to solve the algebraic equation with a corresponding constant from the numerical constants as one side of the algebraic equation. Similar to solving for one numerical constant, an initial iteration from within the plurality of iterations includes identifying the origin tooth as the current tooth and beginning the plurality of iterations from the origin tooth. An arbitrary iteration from the plurality of iterations is defined as any iteration other than the initial iteration, while the previous iteration is defined as the iteration that is executed prior to the arbitrary iteration. Solving for the numerical constants requires identifying the target tooth of the previous iteration as the current tooth of the arbitrary iteration. Consequently, the primary cog is not zeroed before each iteration. For example, once the target tooth of each numerical constant has been aligned to the fixed pointer, then a solution is identified for the algebraic equation. An optimal solution in this example is achieved when a plurality of collective rotations is minimized during the iterations. The plurality of collective rotations is defined as the summation of the rotations executed by each of the secondary cogs during each iteration.

When solving the algebraic equation for more than one numerical constants (e.g. a system of equations), the input entry device 200 allows for constraints in the manner that a user solves for potential solutions. The present disclosure provides a plurality of constraining categories, each of which is associated with a priority rank. The constraining categories are used to guide the steps taken by the user to solve the algebraic equation with the present disclosure. Each numerical constant is assigned to a designated category from the plurality of constraining categories. This allows the system 100 to constraint an execution sequence for the plurality of iterations in accordance to the priority rank of the corresponding constant, and the priority rank is derived from the designated category of the corresponding constant. The execution sequence for the plurality of iterations provides the user with a guide to optimize the manner in which to solve for the potential solutions of the algebraic equation.

Essentially, the execution sequence prompts the user to align the fixed pointer to one category of target teeth before aligning the fixed point to another category of target teeth. The plurality of constraint categories places restrictions on the manner on how the present disclosure can be used to solve the algebraic equation, similar to how a system of equations can be solved in multiple ways but is still mathematically constrained. The algebraic equation may but need not contain only whole numbers. Also, in some embodiments, a sequential turn limit may be applied to each of the secondary cogs in order to indicate the number of rotations by a secondary cog has exceeded the most optimal solution by a significant amount. Consequently, the plurality of rotations with each of the secondary cogs 2 may not exceed the sequential turn limit.

In the illustrated embodiment, the input entry device 200 is implemented in the form of a physical apparatus. The physical apparatus 200 includes a multitude of gears and a support structure 202. The primary cog and the secondary cogs are expressed by the gears. The gears are rotatably mounted to the support structure 202, e.g., on rotatable spindles provided thereon as shown in FIG. 13, and are positioned as described herein. The user 236 may rotate the secondary cogs 2 (individually labeled A, B, and C for illustration) in order to identify the solution to the algebraic equation. That is, in this example, to find a solution to an algebraic equation presented to the user 136, the user 136 must physically rotate the secondary cog(s) A, B, and/or C. And, each rotation of each secondary cog may be a physical action that may be recorded by the structure 102 and evaluated thereby to determine the pros and cons of the solution chosen by the user 136. The user input may be communicated over the network 104A to the structure 102. For example, if the user 136 rotates the secondary cog A once clockwise and the secondary cog C twice counterclockwise, each of these inputs may be communicated to the structure 102 and evaluated by the software 114 as discussed herein.

In an embodiment, the adaptive engine 126 may present the problem to the user 136 via the input/output device 109 (e.g., a display). The user 136 may attempt to solve the problem displayed on the display 109 by physically rotating one or more secondary cogs 2 of the input entry device 200. The adaptive engine 126, e.g., the evaluator 124 thereof, may evaluate these inputs to determine whether the user 136 provided the optimal solution to the problem. If so, the adaptive engine 126, using e.g., the performance module 152, may present to the user 136 via the input/output device 109 a suitable problem 127 from a different teaching topic. Conversely, if the evaluator 124 evaluates the user input and determines that the solution provided by the user 136 is a solution other than the optimal solution, the subsequent suitable problem 127 presented to the user 136 may be from the same teaching topic. The difficulty rank of the problems presented to the user 136 may be increased or decreased by engine 126 in line with the user input. And, as discussed above, the difficulty rank assigned to a particular problem may further be adaptively modified based on the inputs received by a statistically significant number of users.

Additional detail is now provided to illustrate how the input entry device 200 may be used to solve a problem—in this case, an algebraic equation—presented to the user 136 by the adaptive engine 126 via the input/output device 109.

As can be seen in FIG. 14, the secondary cog A of the example input entry device 200 has three teeth. Secondary cog B has five teeth. And secondary cog C has seven teeth. The primary cog 1 has 40 teeth. The target tooth 5 is seven teeth away from the origin tooth 4 (i.e., counting clockwise from the origin). Based on the configuration of the primary cog and the secondary cogs, FIG. 1 may be represented by the following equation:

$$3x+5y+7z=7 \qquad [[Eq.1]]$$

where the 3 in 3x refers to the number of teeth in secondary cog A, the 5 in 5y refers to the number of teeth in secondary cog B, the 7 in 7z refers to the number of teeth in secondary cog C, and 7 at the right hand side of the equation refers to the position of the target tooth of the primary cog relative to the origin tooth. The variable x refers to the number of rotations of cog A (clockwise is positive and counter clockwise is negative), as also discussed herein. The variable y refers to the number of rotations of cog B. And variable z refers to the number of rotations of cog C. The goal in this example is to rotate the primary cog so that the target tooth lands beneath the marker 3.

The artisan will appreciate that equation 1 has numerous solutions. And each of these solutions helps provide insight into the problem solving prowess of the user 136. For example, a student Sam can use the input entry device 200 of FIG. 14 to solve Equation 1 as follows. Sam may physically rotate cog C clockwise once. If cog C is rotated once in the clockwise direction, because it has seven teeth that are enmeshed with the primary cog 1, the primary cog will move seven teeth counterclockwise. This would leave the target tooth below the marker 3. In terms of the symbolic equation, since cog A is not rotated, the value of x is zero. Similarly, since cog B is not rotated, the value of y is zero. And because cog C is rotated once, the value of z is 1. This provides one way to solve Equation 1.

$$x=0,\ y=0,\ z=1 \qquad [[Sam's\ approach]]$$

i.e., 3(0)+5(0)+7(1)=7.

But, Equation 1 can also be solved in other ways. For example, a student Shelly may rotate cog B clockwise two times, and then rotate cog A counter-clockwise once. That too will result in the target tooth landing beneath the marker 3. In terms of symbols:

$$x=-1,\ y=2,\ z=0; \qquad [[Shelly's\ approach]]$$

i.e., 3(−1)+5(2)+7(0)=7.

Both the solutions above are correct. But, in this example and as noted above, the optimal solution is achieved by minimizing the collective rotation of the secondary cogs. Sam's solution above required one step whereas Shelly's solution required two. Therefore, if this data set were the only data set available, the system 100 may determine that Sam is more proficient at solving algebraic equations than Shelly. Therefore, if the suitable problem 127 to be presented to each of Sam and Shelly were an algebraic equation, the adaptive engine 126 may subsequently present an algebraic problem to Sam whose difficulty rank is greater than the difficulty rank of the algebraic problem presented to Shelly.

Indeed, the steps that the user 136 takes with the input entry device 200 (and other such input entry devices) may provide much insight into the user's problem solving abilities with respect to the teaching topic to which the problem belongs. Consider FIG. 14 again, but now assume that secondary cog C is omitted. As will become clear from the discussion herein, the representative equation would then be:

$$3x+5y=7 \qquad [[Eq.2]]$$

Assume that Sam solves Equation 2 by rotating cog B clockwise two times and cog A counter-clockwise once (i.e., x=−1 and y=2). This would be the most efficient solution to Equation 2. However, to solve Equation 2 in this manner, Sam must know that 2×5=10. That is, if Sam solves Equation 2 in the manner just described, the adaptive engine 126 may determine that Sam understands at least the basics of multiplication operations. The system 100 may therefore chose as a suitable problem (i.e., the problem subsequently presented to Sam) a more complex problem involving multiplication or a problem in a different teaching topic (e.g., division).

Assume now that Sam solves Equation 2 a different way. For example, assume Sam solves Equation 2 by rotating cog B clockwise once, rotating cog A counter-clockwise once, and then by rotating cog B clockwise once again. This particular solution indicates that Sam is not proficient at multiplication because he used only addition and subtraction to solve Equation 2. In this case, the adaptive engine 126 may subsequently present to Sam a different problem (e.g., a problem in which the complexity of the addition is increased or a problem in which the complexity of the multiplication is decreased). In this way, thus, the system 100 may continually evaluate the progress of the user 136 and present to him or her problems that challenge the abilities of the user 136 while ensuring that the user 136 is within his ZPD.

In embodiments, the physical input entry device 200 may be configurable by the user 136. For instance, and with respect to the input entry device 200 described as an example herein, the user 136 may be allowed to add or subtract gears from the device 200 (e.g., the support structure 202 may allow for the user 136 to: rotatably couple additional secondary gear(s) to the primary gear; remove one or more secondary gears; add or remove one or more teeth from the primary gear and/or the secondary gear; use a differently sized primary gear, etc.). Such selective configurability of the physical input entry device 200 may further increase the versatility of the system 100. Other input entry devices (e.g., device 300, device 400, etc.) discussed herein may likewise be selectively configurable.

Figure 15:
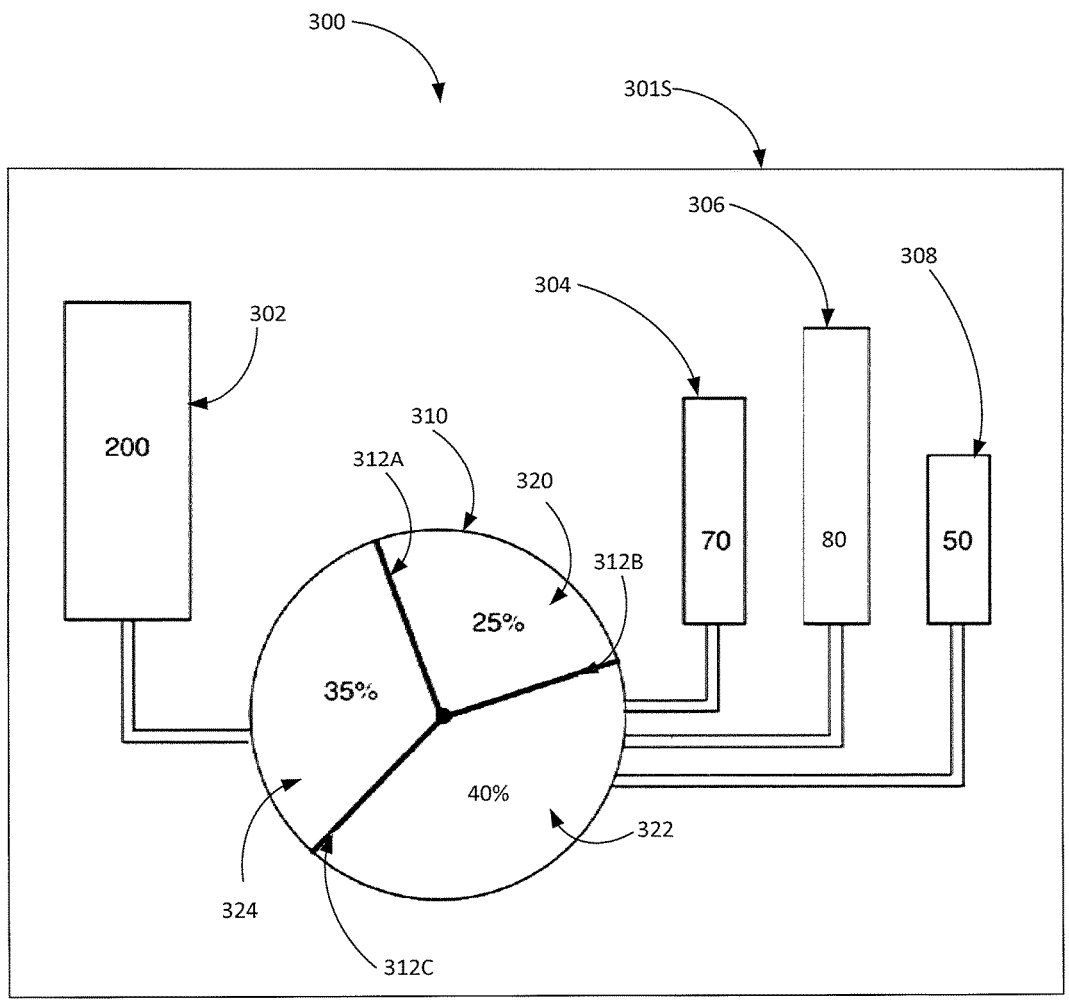
FIG. 15 is a schematic representation of another example of a physical input entry device of the system of FIG. 13, in an embodiment.

The artisan will appreciate from the disclosure herein that the gear system 200 is but one example of the input entry device 134, and other input entry devices for use with the adaptive system for teaching content 100 are also contemplated. FIG. 15, for instance, shows another example 300 of the input entry device 134. The input entry device 300 may also be referred to herein as a hydraulic or fluidic teaching device 300.

The input entry device 300 may include a support structure 301S onto which a plurality of tanks are situated. The plurality of tanks may include, for example, an input tank 302 and output tanks 304, 306, and 308.

The input tank 302 may have a volume, e.g., a volume of 200 (ounces, mL, etc.) as indicated thereon in FIG. 15. The input tank 302 may be fluidly coupled to a rotary valve 310, which rotary valve 310 may in-turn be fluidly coupled to each of the output tanks 304, 306, and 308. The rotary valve 310 may but need not be generally circular. The rotary valve 310 may have three (or a different number of) arms 312A, 312B, and 312C that may be used by the user 136 to apportion the volume of fluid that is to flow from the input tank 302 to each of the output tanks 304, 306, and 308. In an embodiment, the number of arms (i.e., three in this example) may define regions (e.g., regions 320, 322, and 324), the number of which may correspond to the number of output tanks. Furthermore, in an embodiment, each region of the rotary valve 310 may correspond to an output tank (e.g., region 320 may correspond to output tank 308, region 322 may correspond to output tank 306, region 324 may correspond to output tank 304, etc.). Each of the output tanks 304, 306, and 308 and their associated regions in the valve 310 may be color coded to provide a visual indication of the correspondence between the regions and the output tanks. Further, in embodiments, the valve regions may indicate proportions (e.g., as percentages as illustrated, or as factions, decimals, by visual area (without labels), etc.).

In an embodiment, the goal may be to apportion liquid flowing from the input tank 302 of a given capacity into two or more output tanks of given capacities. In standard use, all output tanks may have to be filled exactly. The user 136 may adjust arms (e.g., arms 312A, 312B, and/or 312C) and then initiate flow from the input tank 302 to the output tanks 304, 306, and/or 308. The input tank 302 may eventually empty and the fluid may flow into the output tanks in the proportions set by the user 136. The artisan will understand that it may require two or more flow sequences to fill the output tanks. The input tank 302 may fill automatically after each flow sequence. Further, the arms 312A, 312B, and 312C may be re-set after each flow sequence. In this way, the device 300 may be used to teach the user 136 about percentages, among other topics. The subsequent problem may be set in line with the user input (e.g., from the same or a different topic) as discussed herein.

The artisan will appreciate that the number of input tank 302 and the output tanks 304, 306, and 308, arms, regions, etc., shown in FIG. 15 are merely exemplary and that a different number thereof may also be provided (e.g., the input/output device 109 may display the configuration to be used by the user 136 and the user 136 may configure the device 300, e.g., the input tanks, output tanks, valves, etc. thereof in line with the instructions displayed on the input/output device 109 by the software 114).

Figure 16:
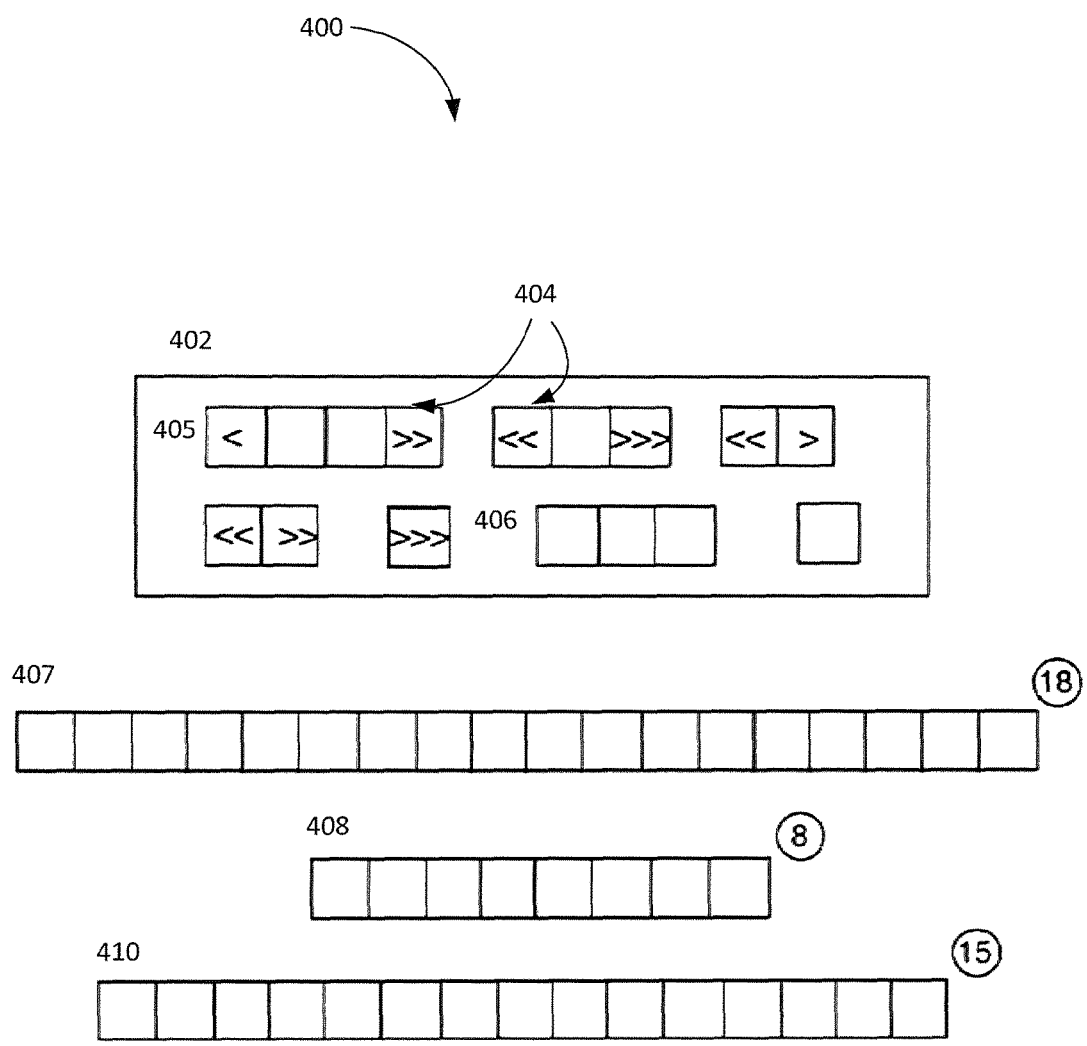
FIG. 16 is a schematic representation of yet another example of a physical input entry device of the system of FIG. 13, in an embodiment.

FIG. 16 shows yet another embodiment 400 of the input entry device 134, which, as noted, may be a physical device that is communicatively coupled to the structure 102. The input entry device 400 may include a tray 402 of movable tiles 404. Each tile 404 may have a specified growth rule indicated by, e.g., chevrons or other marking. On initiating a move (e.g., a Grow move), each tile 404 may expand in the direction of the chevron and the expansion thereof may correspond to the number of chevrons associated therewith. For example, the tile 405 may initially expand one unit square to the left and two unit squares to the right to form a tile having an overall length of 7 unit squares, with a single left chevron pointed at its leftmost end and a double right-pointed chevron at its right most end. This tile 405, once expanded, may be expanded yet again via a second Grow move that will cause this tile to have an overall length of 10 unit squares. And so on. Tile 406, conversely, may not grow as it does not have growth markings thereon.

Elements 407, 408, and 410 represent tile beds into which the tiles in the tray 402 may be placed. Each tile bed 407, 408, and 410 may include a label indicating the total number of unit square slots in that bed (e.g., 18, 8, and 15 in FIG. 15). In another embodiment, each unit square in each tile bed may be numbered to assist the user 136 in the determination of a solution.

The goal may to be for the user 136 to take the tiles 404 form the tray 402 and position them in the tile beds in such a way that, by effectuating one or more Grow moves, all tile beds are filled exactly (with no overlapping). Activation of a Grow move may cause all tiles that have been placed in a bed to grow according to their specified growth rule. There may be any number of trays and/or tile beds. The device 400 may provide a mechanism for solving simultaneous linear equations, with a focus on mathematical growth rules (functions). For instance, tile 405 represents the linear growth rule $y=3X+4$. In this example, the optimal solution may be of two forms: fewest number of applications of the Grow move and fewest number of tiles used. If the user 136 determines an optimal solution to a problem, a different (more complex problem from the same or a different topic) may be presented to the user 136. Alternately, if the user 136 is unable to determine the optimal solution, a different (e.g., a less complex problem from the same topic) may be presented to the user 136. In this way, thus, the input entry device 134 may allow the system 100 to educate the user 136 while ensuring that the user 136 remains within his or her ZPD.

The artisan will understand that while the disclosure focuses on a physical input entry device 134 usable by the user 136 to provide inputs that are then captured and evaluated by the structure 102, that in other embodiments, the input entry device 134 may be provided as software with which the user 136 may interact via conventional means (e.g., via a keyboard and mouse, etc.). However, in some embodiments, it may be preferable to use the physical input entry device 134 at least because the real-world experience provided thereby may be more memorable for the user 136 (as compared to pressing the keys of a keyboard and/or moving the mouse to cause virtual gears on the screen to rotate in like fashion).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps described herein and/or listed in the various figures need be carried out or need to be carried out in the specific order described.

The disclosure claimed is:

1. A method for adaptively teaching content to a user, comprising:
    providing a plurality of teaching topics;
    sequentially associating a lead problem and a plurality of secondary problems with each of said plurality of teaching topics; each of said lead problems and said plurality of secondary problems being an open-ended puzzle having a range of solutions and a difficulty rank; said range of solutions for each of said lead problems and said plurality of secondary problems including an optimal solution and a plurality of secondary solutions; said difficulty rank of said lead problem associated with one teaching topic being greater than said difficulty rank of each of said secondary problems associated with said one teaching topic; said difficulty rank of one secondary problem within said one associated teaching topic being greater than said difficulty rank of a preceding secondary problem within said one associated teaching topic;
    selecting a teaching topic and presenting to said user said lead problem associated with said selected teaching topic;
    providing to said user a physical input entry device, said input entry device comprising: a primary gear and at least one secondary gear, each of said primary gear and said at least one secondary gear being enmeshed with each other such that a rotation of said at least one secondary gear causes said primary gear to rotate therewith; a pointer initially coinciding with an origin tooth of said primary gear; and a sensor to detect movement of said at least one secondary gear;
    obtaining answer data provided by said user via manipulation of said at
        least one secondary gear of said physical input entry device; and
    evaluating said answer data and in response thereto presenting to said user one of: (a) a secondary problem within said selected teaching topic when said answer data matches at least one of said secondary solutions for said lead problem; and (b) a second lead problem from a teaching topic other than said selected teaching topic when said answer data matches said optimal solution for said lead problem.

2. The method of claim 1, wherein each of said lead problem and said plurality of secondary problems is stored in a structure communicatively coupled to said physical input entry device.

3. The method of claim 2, wherein said structure includes a performance evaluator.

4. The method of claim 2, wherein said computing structure includes a tutor module.

5. The method of claim 1, further comprising adaptively modifying a difficulty rank of at least one of said lead problem and said plurality of secondary problems based on inputs provided by a plurality of subjects.

6. The method of claim 5, wherein said physical input entry device is selectively configurable.

7. The method of claim 6, wherein said plurality of subjects includes a statistically significant number of subjects.

8. A method for adaptively teaching content to a user, comprising:
    providing a plurality of teaching topics;
    sequentially associating a lead problem and a plurality of secondary problems with each of said plurality of teaching topics; each of said lead problems and said plurality of secondary problems being an open-ended puzzle having a range of solutions and a difficulty rank; said range of solutions for each of said lead problems and said plurality of secondary problems including an optimal solution and a plurality of secondary solutions;
    selecting a teaching topic and presenting to said user said lead problem associated with said selected teaching topic;
    providing to said user a physical input entry device; said physical input entry device comprising an input tank, a plurality of output tanks, and a valve having a plurality of configurable regions; each of the plurality of configurable regions being associated with one of said plurality of output tanks; said input tank being selectively and fluidly coupled to said plurality of output tanks via said valve;
    obtaining answer data provided by said user via said physical input entry device; and
    evaluating said answer data and in response thereto presenting to said user one of: (a) a secondary problem from said selected teaching topic when said answer data matches at least one of said secondary solutions for said lead problem; and (b) a second lead problem from a teaching topic other than said selected teaching topic when said answer data matches said optimal solution for said lead problem.

9. The method of claim 8, further comprising adaptively modifying a difficulty rank of at least one of said plurality of secondary problems.

10. The method of claim 8, wherein at least one of said teaching topics is associated with mathematics.

11. The method of claim 9, wherein said adaptive modification occurs in response to inputs provided by a plurality of subjects.

12. The method of claim 11, wherein said plurality of subjects includes a statistically significant number of subjects.

13. A method for adaptively teaching content to a user, comprising:
    providing a plurality of teaching topics;
    associating a lead problem and a plurality of secondary problems with each of said plurality of teaching topics; each of said lead problems and said plurality of secondary problems being an open-ended puzzle having a range of solutions; said range of solutions for each of said lead problems and said plurality of secondary problems including an optimal solution and a plurality of secondary solutions;

selecting a teaching topic and presenting to said user said lead problem associated with said selected teaching topic;

providing to said user a physical input entry device; said physical input entry device comprising a plurality of tiles, each of said plurality of tiles having associated therewith a respective growth rule; said respective growth rule being usable to solve a presented problem;

obtaining answer data provided by said user via said physical input entry device; and evaluating said answer data and in response thereto presenting to said user one of: (a) a secondary problem from said selected teaching topic when said answer data matches at least one of said secondary solutions for said lead problem; and (b) a second lead problem from a teaching topic other than said selected teaching topic when said answer data matches said optimal solution for said lead problem.

14. The method of claim 13, wherein each teaching topic has associated therewith a terminal secondary problem which has a difficulty rank greater than a difficulty rank of a secondary problem that precedes said terminal secondary problem.

15. The method of claim 13, further comprising using an assessment module to determine a base competency of said user.

16. The method of claim 13, further comprising using a tutor module to tutor said subject.

* * * * *